US010803683B2

(12) United States Patent
Segawa et al.

(10) Patent No.: US 10,803,683 B2
(45) Date of Patent: Oct. 13, 2020

(54) INFORMATION PROCESSING DEVICE, INFORMATION PROCESSING METHOD, COMPUTER PROGRAM PRODUCT, AND MOVING OBJECT

(71) Applicant: Kabushiki Kaisha Toshiba, Minato-ku (JP)

(72) Inventors: Junichi Segawa, Kawasaki (JP); Tatsunori Kanai, Yokohama (JP); Takashi Yoshikawa, Setagaya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 11 days.

(21) Appl. No.: 15/682,736

(22) Filed: Aug. 22, 2017

(65) Prior Publication Data
US 2018/0232967 A1 Aug. 16, 2018

(30) Foreign Application Priority Data
Feb. 14, 2017 (JP) .................................. 2017-024932

(51) Int. Cl.
*G07C 5/08* (2006.01)
*B60W 40/00* (2006.01)
*H04N 7/18* (2006.01)
*B60W 50/00* (2006.01)

(52) U.S. Cl.
CPC ........... *G07C 5/0841* (2013.01); *B60W 40/00* (2013.01); *G07C 5/085* (2013.01); *H04N 7/188* (2013.01); *B60W 2050/0089* (2013.01); *B60W 2530/14* (2013.01); *H04N 7/18* (2013.01)

(58) Field of Classification Search
None
See application file for complete search history.

(56) References Cited

U.S. PATENT DOCUMENTS

| 5,345,388 | A | | 9/1994 | Kashiwazaki |
| 5,638,273 | A | * | 6/1997 | Coiner .................. G07C 5/085 360/5 |
| 5,793,325 | A | | 8/1998 | Yamada |
| 10,156,848 | B1 | * | 12/2018 | Konrardy ............. G05D 1/0088 |
| 2002/0035422 | A1 | | 3/2002 | Sasaki |
| 2004/0267455 | A1 | | 12/2004 | Hatano et al. |
| 2005/0065667 | A1 | * | 3/2005 | Weineck ............ B64D 45/0015 701/3 |
| 2008/0059020 | A1 | * | 3/2008 | Sato ....................... G07C 5/085 701/33.4 |

(Continued)

FOREIGN PATENT DOCUMENTS

| EP | 3 244 321 A1 | 11/2017 |
| JP | 5-52580 A | 3/1993 |

(Continued)

Primary Examiner — Redhwan K Mawari
Assistant Examiner — Melanie J Patrick
(74) Attorney, Agent, or Firm — Oblon, McClelland, Maier & Neustadt, L.L.P.

(57) ABSTRACT

An information processing device according to an embodiment includes a storage device and one or more processors configured to function as a setting unit and a record control unit. The setting unit sets a record level of history information according to a reliability of derivative information derived from output information of a sensor. The record control unit performs control to store the history information in the storage device according to the record level.

7 Claims, 10 Drawing Sheets

(56) References Cited

U.S. PATENT DOCUMENTS

| | | | |
|---|---|---|---|
| 2012/0053853 A1 | 3/2012 | Tan | |
| 2012/0197481 A1 | 8/2012 | Takeda | |
| 2016/0025505 A1* | 1/2016 | Oh | G05D 1/0217 |
| | | | 701/23 |
| 2017/0031364 A1* | 2/2017 | Takahashi | G01C 21/20 |
| 2017/0076599 A1* | 3/2017 | Gupta | B60Q 9/00 |
| 2017/0120804 A1* | 5/2017 | Kentley | G05D 1/0088 |
| 2017/0227971 A1* | 8/2017 | Shimotani | B60W 30/12 |
| 2017/0278320 A1 | 9/2017 | Isozaki et al. | |
| 2017/0285661 A1* | 10/2017 | Harada | B64C 39/024 |
| 2017/0291615 A1* | 10/2017 | Kusano | B60W 50/14 |
| 2017/0328726 A1 | 11/2017 | Matsuzawa et al. | |
| 2017/0337816 A1* | 11/2017 | Lu | G08G 1/0962 |
| 2018/0127001 A1* | 5/2018 | Ricci | B60R 25/2018 |
| 2019/0106118 A1* | 4/2019 | Asakura | G08G 1/00 |

FOREIGN PATENT DOCUMENTS

| | | |
|---|---|---|
| JP | 9-222477 A | 8/1997 |
| JP | 2002-42288 A | 2/2002 |
| JP | 2005-038381 | 2/2005 |
| JP | 2005-195536 A | 7/2005 |
| JP | 2009-289204 | 12/2009 |
| JP | 2017-174111 | 9/2017 |
| WO | WO 2016/111068 A1 | 7/2016 |

\* cited by examiner

| VEHICLE A: POSITION INFORMATION, SPEED INFORMATION, ⋯ |
| VEHICLE B: POSITION INFORMATION, SPEED INFORMATION, ⋯ |
| PEDESTRIAN A: POSITION INFORMATION, SPEED INFORMATION, ⋯ |

| DETERMINATION REFERENCE INFORMATION | TRAVEL STRATEGY INFORMATION | TRAVEL DIFFICULTY INFORMATION |
|---|---|---|
| CURRENT TRAVEL ROAD IS EXPRESSWAY AND TRAVEL LANE IS INSIDE LANE AND DISTANCE FROM FRONT MOVING OBJECT IS EQUAL TO OR LONGER THAN THRESHOLD | KEEP INSIDE LANE | 10 |
| CURRENT TRAVEL ROAD IS EXPRESSWAY AND TRAVEL LANE IS INSIDE LANE AND DISTANCE FROM FRONT MOVING OBJECT IS EQUAL TO OR SHORTER THAN THRESHOLD AND NO MOVING OBJECT AT DISTANCE EQUAL TO OR SHORTER THAN THRESHOLD ON PASSING LANE | MOVE TO PASSING LANE | 50 |
| CURRENT TRAVEL ROAD IS EXPRESSWAY AND TRAVEL LANE IS PASSING LANE AND NO MOVING OBJECT AT DISTANCE EQUAL TO OR SHORTER THAN THRESHOLD ON INSIDE LANE | MOVE TO INSIDE LANE | 40 |

| RELIABILITY | RECORD OBJECT/ NON-RECORD OBJECT | RECORD LEVEL | | |
| --- | --- | --- | --- | --- |
| | | RECORD DETAIL LEVEL | RECORD INTERVAL | STORAGE PERIOD |
| LOWER THAN 5 | RECORD OBJECT | HIGH | 50 ms | ONE MONTH |
| EQUAL TO OR HIGHER THAN 5 AND LOWER THAN 10 | RECORD OBJECT | HIGH | 100 ms | TWO WEEKS |
| EQUAL TO OR HIGHER THAN 10 AND LOWER THAN 50 | RECORD OBJECT | MEDIUM | 1 s | ONE WEEK |
| EQUAL TO OR HIGHER THAN 50 AND LOWER THAN 80 | RECORD OBJECT | LOW | 10 s | ONE DAY |
| EQUAL TO OR HIGHER THAN 80 | NON-RECORD OBJECT | - | - | - |

FIG.9

| DERIVATIVE INFORMATION | | OUTPUT INFORMATION | RECORD LEVEL | |
|---|---|---|---|---|
| ITEM | ITEM DERIVATIVE INFORMATION | | RECORD DETAIL LEVEL | RECORD INTERVAL |
| RECOMMENDED LANE INFORMATION | ADVANCE | OUTPUT INFORMATION FROM FRONT SENSOR | HIGH RESOLUTION | SHORT |
| RECOMMENDED LANE INFORMATION | BACK | OUTPUT INFORMATION FROM REAR SENSOR | LOW RESOLUTION | LONG |
| RECOMMENDED LANE INFORMATION | RIGHT TURN LANE | OUTPUT INFORMATION FROM FRONT SENSOR | LOW RESOLUTION | LONG |
| RECOMMENDED LANE INFORMATION | LEFT TURN LANE | OUTPUT INFORMATION FROM REAR SENSOR | HIGH RESOLUTION | SHORT |
| TRAVEL LANE | EXPRESSWAY | OUTPUT INFORMATION FROM FRONT SENSOR | HIGH RESOLUTION (RIGHT SIDE REGION) | SHORT |
| TRAVEL LANE | GENERAL ROAD | OUTPUT INFORMATION FROM FRONT SENSOR | HIGH RESOLUTION (LEFT SIDE REGION) | SHORT |
| | | OUTPUT INFORMATION FROM REAR SENSOR | HIGH RESOLUTION | SHORT |
| | | OUTPUT INFORMATION FROM FRONT SENSOR | REFERENCE RESOLUTION | MEDIUM |
| | | OUTPUT INFORMATION FROM REAR SENSOR | ONLY DETECTION POINT AT DISTANCE EQUAL TO OR SHORTER THAN THRESHOLD | MEDIUM |
| SPEED INFORMATION | HIGH SPEED | OUTPUT INFORMATION FROM SENSOR | HIGH RESOLUTION | SHORT |
| SPEED INFORMATION | LOW SPEED | OUTPUT INFORMATION FROM SENSOR | ONLY DETECTION POINT AT DISTANCE EQUAL TO OR SHORTER THAN THRESHOLD | MEDIUM |

54

INFORMATION PROCESSING DEVICE, INFORMATION PROCESSING METHOD, COMPUTER PROGRAM PRODUCT, AND MOVING OBJECT

CROSS-REFERENCE TO RELATED APPLICATIONS

This application is based upon and claims the benefit of priority from Japanese Patent Application No. 2017-024932, filed on Feb. 14, 2017; the entire contents of which are incorporated herein by reference.

FIELD

Embodiments described herein relate generally to an information processing device, an information processing method, a computer program product, and a moving object.

BACKGROUND

A system, which records an operation situation of a vehicle to be useful for operation management of the vehicle, has been disclosed. For example, a system, which records output information at the time of determining that a vehicle is in a dangerous state using the output information such as traveling speed and rotational speed output from various sensors mounted on the vehicle, has been disclosed.

Here, a processor mounted on a moving object derives various types of information. Conventionally, however, history information such as output information is recorded based on simple determination on whether or not output information output from a sensor is equal to or more than a threshold, or the like, and a suitable record on the history information is not performed.

BRIEF DESCRIPTION OF THE DRAWINGS

FIG. 5 is a schematic diagram illustrating the peripheral situation information;
FIG. 6 is a schematic diagram illustrating a reference management table;
FIG. 8 is a schematic diagram illustrating a data configuration of a record level correspondence DB;
FIG. 9 is a schematic diagram illustrating an output information correspondence DB.

DETAILED DESCRIPTION

An information processing device according to an embodiment includes a storage device and one or more processors configured to function as a setting unit and a record control unit. The setting unit sets a record level of history information according to a reliability of derivative information derived from output information of a sensor. The record control unit performs control to store the history information in the storage device according to the record level.

Hereinafter, an information processing device, an information processing method, a computer program product, and a moving object will be described in detail with reference to the accompanying drawings.

Figure 1:
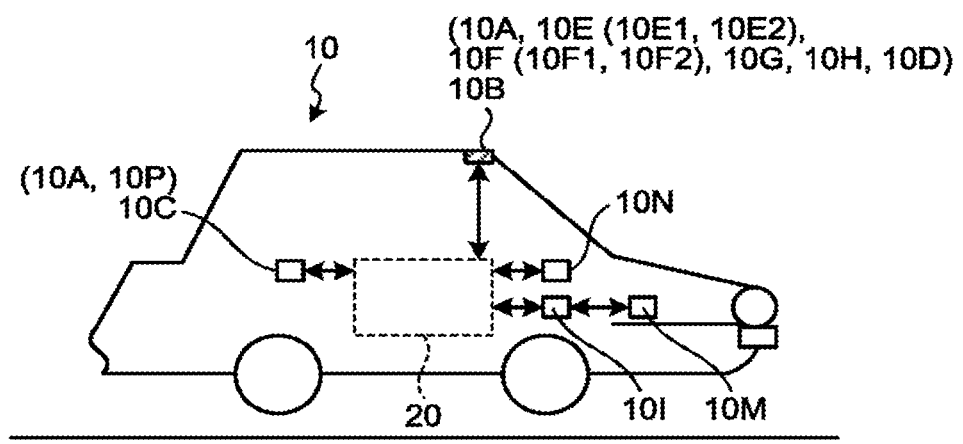
FIG. 1 illustrates a moving object.

FIG. 1 is a diagram illustrating an example of a moving object 10 according to an embodiment of the present invention.

The moving object 10 includes an information processing device 20, a sensor 10A, an output unit 10N, a drive control unit 10I, and a drive unit 10M.

The information processing device 20 is, for example, a dedicated or general-purpose computer. In the present embodiment, a case where the information processing device 20 is mounted on the moving object 10 will be described as an example.

The moving object 10 is a movable object. The moving object 10 is, for example, a vehicle, a bogie, an object capable of flying (a manned airplane, an unmanned airplane (for example, an unmanned aerial vehicle (UAV) or a drone), a robot, personal mobility, or the like. In addition, the moving object 10 is, for example, a moving object traveling with a driving operation by a person or a moving object capable of automatically traveling (being automatically operated) without a driving operation by a person. In the present embodiment, a case where the moving object 10 is the vehicle will be described as an example. The vehicle is, for example, a two-wheeled vehicle, a three-wheeled vehicle, a four-wheeled vehicle, or the like. In the present embodiment, a case where the vehicle is the four-wheeled vehicle that can be automatically operated will be described as an example.

Incidentally, the information processing device 20 is not limited to the form of being mounted on the moving object 10. The information processing device 20 may be mounted on a stationary object. The stationary object is an object fixed to the ground. The stationary object is an immovable object or an object in the state of being stationary with respect to the ground. The stationary object is, for example, a guardrail, a pole, a parked vehicle, a road sign, or the like. In addition, the information processing device 20 may be mounted on a cloud server that executes processing on a cloud.

The drive unit 10M is a driving device mounted on the moving object 10. The drive unit 10M is, for example, an engine, a brake driving unit, a steering driving unit, an accelerator driving unit, or the like.

The drive control unit 10I controls the drive unit 10M. The drive unit 10M is operated by control of the drive control unit 10I. For example, the drive control unit 10I controls the drive unit 10M based on output information output from the sensor 10A and derivative information (details thereof will be described later) derived from the output information in order to automatically operate the moving object 10. A steering amount, a braking amount, an acceleration amount, and the like of the moving object 10 are controlled by control of the drive unit 10M. For example, the drive control unit 10I controls the vehicle so as to keep a lane on which the vehicle is currently traveling while avoiding an obstacle object and to keep an inter-vehicle distance with a forward vehicle to be equal to or larger than a predetermined distance.

The output unit 10N outputs various types of information. The output unit 10N has, for example, a communication function to communicate various types of information with an external device, a display function to display various types of information, a sound output function to output sound indicating various types of information, and the like. For example, the output unit 10N includes at least one of a communication unit, a display, and a speaker.

The sensor 10A is a device or an equipment that detects a physical phenomenon of an object or a change of a physical state of an object, converts the detected result into a signal or data, and outputs the converted result. In the present embodiment, the sensor 10A is used for sensing of situations of an internal and an external of the moving object 10. In the present embodiment, the sensor 10A includes an external sensor 10B and an internal sensor 10C.

The external sensor 10B is the sensor 10A that senses the external world in the periphery of the moving object 10. The external sensor 10B may be mounted on the moving object 10 or may be mounted outside the moving object 10. The outside of the moving object 10 indicates, for example, another moving object, an external device, or the like.

The external sensor 10B senses the external world and outputs the sensing result as output information.

The external sensor 10B is, for example, a camera (imaging device), a distance sensor (a millimeter wave radar or a laser sensor), a sonar sensor that detects an object by sound waves, an ultrasonic sensor, a communication device with an external device, or the like. The laser sensor is, for example, a two-dimensional laser imaging detection and ranging (LIDAR) sensor or a three-dimensional LIDAR sensor installed to be parallel to the horizontal plane.

A plurality of at least one type among these plural types of external sensors 10B may be provided in a form of being mounted on the moving object 10. In addition, the moving object 10 may be provided in a form of mounting the one-type external sensor 10B, or a form of mounting the plurality of types of external sensors 10B.

In the present embodiment, a case where the external sensor 10B includes a camera 10E, an LIDAR 10F, a millimeter wave radar 10G, an ultrasonic sensor 10H, and a V2X module 10D will be described.

The camera 10E obtains captured image data (hereinafter, referred to as a captured image) by capturing. Examples of capturing devices include a monocular camera, a stereo camera, a position specifying camera, a color aperture camera sensor, and the like. The captured image is digital image data in which a pixel value is defined for each pixel, a depth map in which a distance from the camera 10E is defined for each pixel, or the like.

In the present embodiment, a case where a plurality of the cameras 10E (a camera 10E1 and a camera 10E2) is mounted on the moving object 10 will be described as an example. These plurality of cameras 10E are arranged such that at least a part of a capturing angle of view is different from each other. In this manner, the camera 10E may be capable of capturing the periphery of the moving object 10. In the present embodiment, the camera 10E1 is installed at a position where the camera 10E1 can capture a front side of the moving object 10 (that is, a downstream side of the moving object 10 in a progressing direction). The camera 10E2 is installed at a position where the camera 10E2 can capture a rear side of the moving object 10 (that is, an upstream side of the moving object 10 in the progressing direction).

The camera 10E captures the periphery at predetermined capturing intervals (for example, every 10 msec) and transmits the captured image to the information processing device 20 as output information. Incidentally, the capturing interval of the camera 10E may be changeable according to the surrounding environment or system status or the like.

Incidentally, a capturing direction (capturing angle of view) of the camera 10E is not limited to the periphery of the moving object 10. For example, the camera 10E may be installed in a direction in which the inside of the moving object 10 can be captured. In this case, for example, some of the plurality of cameras 10E may be installed at a position where a driver and a fellow passenger of the moving object 10 can be captured.

The LIDAR 10F is a sensor that measures a distance to an object by emitting a pulsed laser, measuring reflected light, and measuring time taken until arrival of the reflected light.

In the present embodiment, a case where a plurality of the LIDARs 10F (an LIDAR 10F1 and an LIDAR 10F2) are provided in the moving object 10 will be described as an example. The LIDAR 10F1 is installed at a position where the front side of the moving object 10 (that is, the downstream side of the moving object 10 in the progressing direction) can be measured. The LIDAR 10F2 is installed at a position where the rear side of the moving object 10 (that is, the upstream side of the moving object 10 in the progressing direction) can be measured.

The LIDAR 10F measures the periphery at predetermined intervals (for example, every 10 msec) and transmits a result obtained by measuring the distance to the object (hereinafter, referred to as LIDAR information) to the information processing device 20 as output information. Incidentally, the measurement interval of the LIDAR 10F may be changeable according to the surrounding environment or system status or the like.

The millimeter wave radar 10G is a sensor that measures the distance to a surrounding object by using radio waves having a wavelength of a millimeter wave band. The ultrasonic sensor 10H transmits an ultrasonic wave and receives the reflected wave thereof by a wave receiver. Accordingly, the ultrasonic sensor 10H detects presence or absence of the object and the distance to the object. Incidentally, it may be configured such that a plurality of the millimeter wave radars 10G and a plurality of the ultrasonic sensors 10H are also mounted on the moving object 10.

The millimeter wave radar 10G measures the periphery at predetermined intervals (for example, every 10 msec) and transmits a result obtained by measuring the distance to the object (hereinafter, referred to as millimeter wave radar information) to the information processing device 20 as output information. Incidentally, the measurement interval of the millimeter wave radar 10G may be changeable according to the surrounding environment or the like.

The V2X module 10D is a communication module, arranged on the road, configured to directly and wirelessly communicate with another information processing device or an external device without a communication infrastructure. For such direct wireless communication, vehicle-to-everything (V2X) communication is used, for example.

The V2X communication includes vehicle-to-vehicle (V2V) communication using IEEE802.11p, vehicle-to-infrastructure (V2I) communication, vehicle-to-pedestrian (V2P) communication, vehicle-to-house (V2H) communication, and the like. In the V2X communication, direct wireless communication is performed using wildcard basic service set identification (BSSID) without establishing BSS. Incidentally, the V2X communication may also be referred to as car-to-X (C2X) communication.

The V2X module 10D communicates a communication message with another information processing device and an external device using direct wireless communication.

The communication message includes, for example, position information (latitude, longitude, altitude, accuracy of position information, and the like) of the moving object 10, size information (a longitudinal length, a lateral length, and the like) of the moving object 10, movement information (speed, a direction, acceleration in a progressing direction, acceleration in a lateral direction, a yaw angle, and the like) of the moving object 10, information indicating an operation state of the moving object 10 (an operation amount of a brake, an accelerator, or a steering, a state of a transmission, a state of an auxiliary brake, a state of an ABS, and the like), information on a state of a traffic light (a color of the traffic light, and the like), information on a road sign (speed limit), and the like.

Specifically, for example, the communication message is a basic safety message (BSM) described in "Vehicle-to-Vehicle Communications: Readiness of V2V Technology for Application" issued by National Highway Traffic Safety Administration (NHTSA), and the like.

Every time when receiving or transmitting the communication message from or to another information processing device and an external device, the V2X module 10D outputs the received or transmitted communication message to the information processing device 20 as output information.

For example, the V2X module 10D performs wireless communication and the like in a predetermined frequency band (for example, 5.9 GHz band, 700 MHz band) and communicates the communication message. Incidentally, an interval of communication performed by the V2X module 10D may be set in advance or variable. The interval of communication performed by the V2X module 10D is, for example, 100 msec.

Next, the internal sensor 10C will be described. The internal sensor 10C is a sensor that senses the moving object 10 itself. The internal sensor 10C acquires position information of the moving object 10, posture information indicating a posture of the moving object 10, and the like. The internal sensor 10C is, for example, a global navigation satellite system (GNSS) module, an inertial measurement unit (IMU), a speed sensor, Global Navigation Satellite System (GNSS), or the like. The IMU obtains triaxial acceleration, triaxial angular velocity, and the like of the moving object 10. Incidentally, the position information of the moving object 10 is assumed to be represented by world coordinates.

In the present embodiment, a case where the moving object 10 includes a GNSS module 10P as the internal sensor 10C will be described as an example. The GNSS module 10P measures position information and current time (hereinafter simply referred to as the position information) of the moving object 10. The position information is represented by, for example, latitude and longitude. Further, the GNSS module 10P outputs the measured position information to the information processing device 20 as output information.

Next, a hardware configuration of the moving object 10 will be described.

Figure 2:
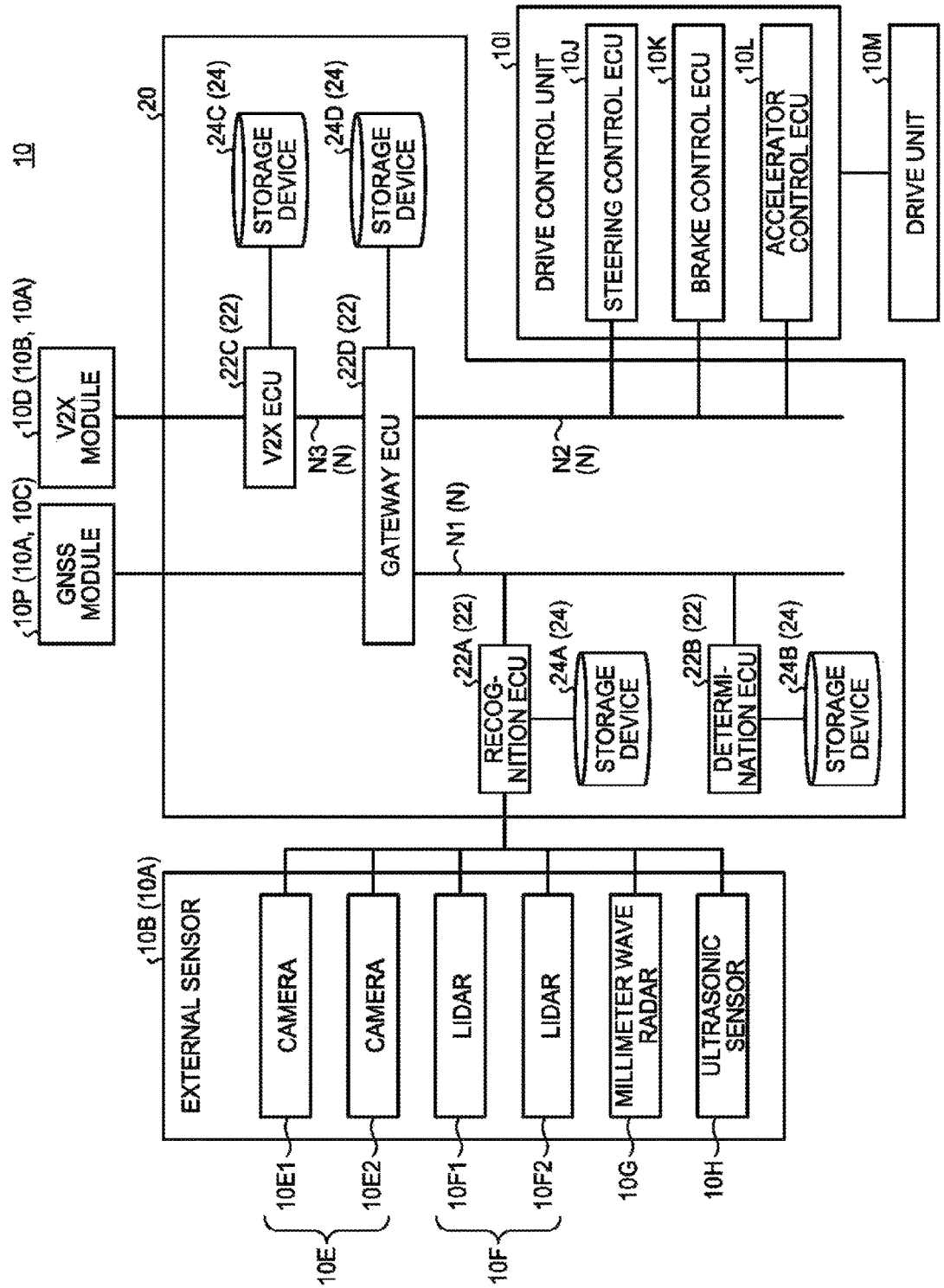
FIG. 2 is a schematic diagram illustrating a hardware configuration.

FIG. 2 is a schematic diagram illustrating an example of the hardware configuration of the moving object 10. As illustrated in FIG. 2, the sensor 10A, the drive control unit 10I, and the information processing device 20 are electrically connected to the moving object 10.

The information processing device 20 has a configuration in which an engine control unit (ECU) 22 and a storage device 24 are electrically connected.

The storage device 24 is a storage device configured to store various types of data. The storage device 24 may be a storage device such as a hard disk drive (HDD), an SSD, and an eMMC, a random access memory (RAM), a magnetoresistive RAM (MRAM), a phase change memory (PCM), a resistance RAM (ReRAM), a ferroelectric RAM (FeRAM), an external memory (a universal serial bus (USB) memory), a semiconductor memory element (a NOR Flash or a NAND Flash) such as a flash memory, an SD card, an optical disk, or the like.

An interface of the storage device 24 is not limited. The interface of the storage device 24 is, for example, a common interface of a storage device such as SATA, SAS, PCIe, and NVMe, an interface for a main memory such as DIMM, a serial peripheral interface (SPI), an inter-integrated circuit (I2C), or the like.

Incidentally, the storage device 24 may be a storage device provided outside the information processing device 20. In addition, the storage device 24 may be a storage medium. In addition, the storage device 24 may be configured of a plurality of storage devices.

In the present embodiment, a case where the storage device 24 is configured of the plurality of storage devices 24 will be described as an example. Specifically, a case where the storage device 24 is configured of a storage device 24A, a storage device 24B, a storage device 24C, and a storage device 24D will be described as an example in the present embodiment.

The ECU 22 is a microcontroller that controls the information processing device 20. The ECU 22 may be configured of the single ECU 22 or a plurality of ECUs. In the present embodiment, a case where the ECU 22 includes a recognition ECU 22A, a determination ECU 22B, a V2X ECU 22C, and a gateway ECU 22D will be described as an example.

The V2X ECU 22C is connected to the V2X module 10D. In addition, the storage device 24C is connected to the V2X ECU 22C. The V2X ECU 22C controls the V2X module 10D. For example, the V2X ECU 22C transmits the communication message to another device via the V2X module 10D. In addition, the V2X ECU 22C outputs the communication message received from another device via the V2X module 10D to the other ECU 22 (for example, the recognition ECU 22A). In addition, the V2X ECU 22C stores the communication message in the storage device 24C.

The gateway ECU 22D is the ECU 22 that connects the plurality of subnetworks N, mounted on the moving object 10, to each other.

The subnetwork N mounted on the moving object 10 may be either wired or wireless. The wired subnetwork N is, for example, a controller area network (CAN), CAN FD, a local interconnect network (LIN), FlexRay, media oriented systems transport (MOST), Ethernet, or the like. In addition, wireless LAN devices of transmission standards such as 802.11a, 802.11b, 802.11g, 802.11n, and 802.11ac, and wireless communication schemes such as Bluetooth (registered trademark) of short-range wireless communication, ZigBee, and TransferJet are used for the wireless subnetwork N.

The gateway ECU 22D divides domains according to the plurality of subnetworks N in the moving object 10. Further, the gateway ECU 22D performs routing of communication across these domains and filtering of communication.

In the present embodiment, the GNSS module 10P and the storage device 24D are connected to the gateway ECU 22D.

The gateway ECU 22D stores various types of information which has passed through the gateway ECU 22D in the storage device 24D.

In addition, the gateway ECU 22D is connected to each of a subnetwork N1, a subnetwork N2, and a subnetwork N3.

The recognition ECU 22A and the determination ECU 22B are connected to the subnetwork N1. The drive control unit 10I is connected to the subnetwork N2. The V2X ECU 22C is connected to the subnetwork N3. In the present embodiment, the gateway ECU 22D is connected to these plurality of subnetworks N (the subnetworks N1, N2 and N3). Thus, the ECU 22 (the recognition ECU 22A, the determination ECU 22B, the V2X ECU 22C) and the drive control unit 10I connected to the respective subnetworks N can communicate with each other via the gateway ECU 22D.

The recognition ECU 22A is connected to the external sensor 10B. The recognition ECU 22A recognizes output information received from the external sensor 10B and derives derivative information from the output information (details thereof will be described later). The storage device 24A is connected to the recognition ECU 22A. The recognition ECU 22A stores a recognition result and the derivative information in the storage device 24A.

The determination ECU 22B generates a travel-planned route and the like of the moving object 10 using the recognition result and the like obtained by the recognition ECU 22A. The storage device 24B stores the travel-planned route and the like generated by the determination ECU 22B.

The drive control unit 10I controls the drive unit 10M as described above. In the present embodiment, the drive control unit 10I includes a steering control ECU 10J, a brake control ECU 10K, and an accelerator control ECU 10L. The steering control ECU 10J controls the steering angle of the moving object 10 by controlling the drive unit 10M depending on the steering amount derived by the information processing device 20. The brake control ECU 10K controls the brake amount of the moving object 10 by controlling the drive unit 10M depending on the brake amount derived by the information processing device 20. The accelerator control ECU 10L controls the acceleration amount of the moving object 10 by controlling the drive unit 10M depending on the acceleration amount derived by the information processing device 20.

Incidentally, the hardware configuration of the moving object 10 is not limited to the form illustrated in FIG. 2.

For example, at least two of the plurality of ECUs 22 (the recognition ECU 22A, the determination ECU 22B, the V2X ECU 22C, and the gateway ECU 22D) may be collectively configured as the single ECU 22. For example, the single ECU 22 in which a core for recognition to execute processing of the recognition ECU 22A and a core for generation to execute processing of the determination ECU 22B are incorporated may be used instead of the recognition ECU 22A and the determination ECU 22B. In addition, it may be configured such that a plurality of general-purpose cores to perform general-purpose processing are mounted in the single ECU 22 so as to collectively execute the processing in the recognition ECU 22A, the determination ECU 22B, the V2X ECU 22C, the gateway ECU 22D, and the like.

In addition, for example, at least two of the plurality of ECUs 22 (the recognition ECU 22A, the determination ECU 22B, the V2X ECU 22C, and the gateway ECU 22D) may be directly connected to each other using PCIe or the like.

In addition, at least two of the plurality of storage devices 24 (the storage device 24A, the storage device 24B, the storage device 24C, and the storage device 24D) may be collectively configured as the single storage device 24.

In addition, the connection form of the respective sensors 10A, the ECU 22 (the recognition ECU 22A, the determination ECU 22B, the V2X ECU 22C, and the gateway ECU 22D) and the storage device 24 is not limited to the example illustrated in FIG. 2. In addition, the configuration of the subnetworks N of the moving object 10 is not limited to the form illustrated in FIG. 2.

For example, FIG. 2 illustrates a case where all the subnetworks N in the information processing device 20 are connected to the gateway ECU 22D. However, a dedicated gateway (for example, a domain control unit (DCU)) for each of the subnetworks N may be connected to each of the subnetworks N. In this manner, a multi-stage gateway may be configured using the DCU. In addition, the storage device 24 may be further connected to each of the DCUs. In addition, for example, the storage device 24 may be further connected to the drive control unit 10I.

In addition, it may be a form in which, for example, at least one of the respective sensors 10A, the ECU 22 (the recognition ECU 22A, the determination ECU 22B, the V2X ECU 22C, and the gateway ECU 22D) and the storage device 24 is connected to the different subnetwork N or the different ECU 22 from that in the example illustrated in FIG. 2.

In addition, the storage device 24 may be mounted on each of the sensors 10A.

In addition, at least some of the sensors 10A may be provided in a form of being connected to any one of the gateway ECU 22D, the subnetwork N1, and a new subnetwork (not illustrated) connected to the gateway ECU 22D.

For example, the camera 10E1 and the camera 10E2 may be provided in a form of being connected to any one of the gateway ECU 22D, the subnetwork N1, and a new subnetwork (not illustrated) connected to the gateway ECU 22D.

In addition, the storage device 24 may be configured to be connected to each of the sensors 10A. In addition, each of the sensors 10A may be configured to include the storage device 24. In addition, the output information output from the respective sensors 10A may be stored in the storage device 24 connected to each of the sensors 10A, and the information processing device 20 may acquire the output information from the storage device 24.

In addition, at least one of the plurality of ECUs 22 may be configured to incorporate the storage device 24.

In addition, the information stored in each of the storage devices 24 is not limited to the above-described one. For example, a part of the information stored in the storage device 24A may be stored in the storage device 24B. In addition, an additional storage device may be configured to be connected to the drive control unit 10I such that information (for example, the acceleration amount) used for control of the drive control unit 10I may be stored in the storage device or stored in the storage device 24A.

Figure 3:
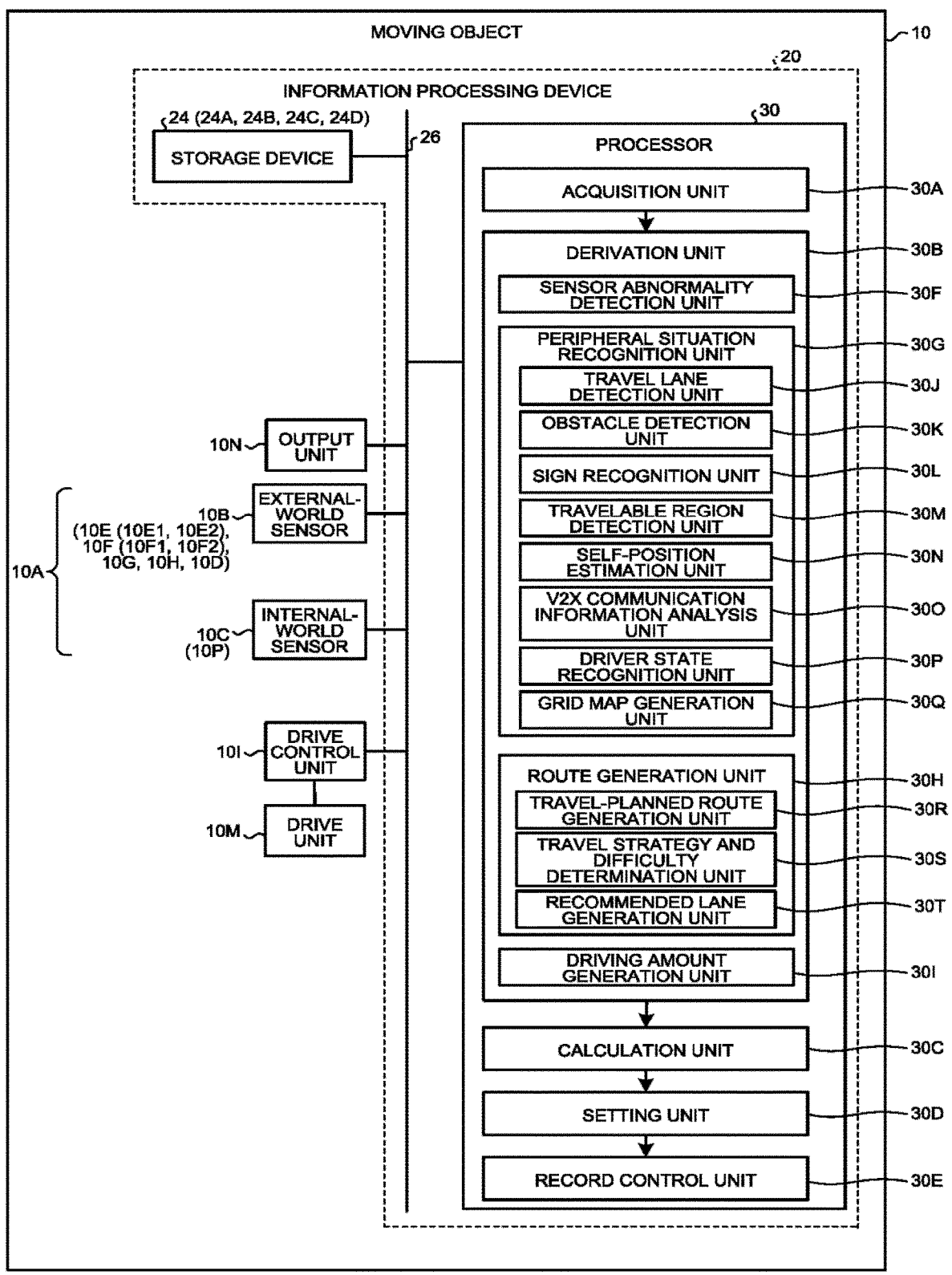
FIG. 3 is a block diagram illustrating a functional configuration of the moving object.

Next, a functional configuration of the moving object 10 will be described in detail. FIG. 3 is a block diagram illustrating an example of the functional configuration of the moving object 10.

The moving object 10 includes the information processing device 20, the output unit 10N, the sensor 10A, and the drive control unit 10I. The information processing device 20, the output unit 10N, the sensor 10A, and the drive control unit 10I are connected via a bus 26 and the like.

The information processing device 20 includes the storage device 24 and a processor 30.

Incidentally, at least one of the storage device 24, the output unit 10N, the sensor 10A (the external sensor 10B (the camera 10E (the camera 10E1 and the camera 10E2), the LIDAR 10F (the LIDAR 10F1 and the LIDAR 10F2), the millimeter wave radar 10G, the ultrasonic sensor 10H, and the V2X module 10D), the internal sensor 10C (the GNSS module 10P)), and the drive control unit 10I may be connected to the processor 30 in a wired or wireless manner. In addition, at least one of the storage device 24, the output unit 10N, the sensor 10A (the external sensor 10B (the camera 10E (the camera 10E1 and the camera 10E2), the LIDAR 10F (the LIDAR 10F1 and the LIDAR 10F2), the millimeter wave radar 10G, the ultrasonic sensor 10H, and the V2X module 10D), the internal sensor 10C (the GNSS module 10P)), and the drive control unit 10I may be connected to the processor 30 via a network.

Since the storage device 24 has been described above, the description thereof is omitted here.

The processor 30 executes various types of processing in the information processing device 20. The processor 30 includes an acquisition unit 30A, a derivation unit 30B, a calculation unit 30C, a setting unit 30D, and a record control unit 30E. The derivation unit 30B includes a sensor abnormality detection unit 30F, a peripheral situation recognition unit 30G, a route generation unit 30H, and a driving amount generation unit 30I. The peripheral situation recognition unit 30G includes a travel lane detection unit 30J, an obstacle detection unit 30K, a sign recognition unit 30L, a travelable region detection unit 30M, a self-position estimation unit 30N, a V2X communication information analysis unit 30O, a driver state recognition unit 30P, and a grid map generation unit 30Q. The route generation unit 30H includes a travel-planned route generation unit 30R, a travel strategy and difficulty determination unit 30S, and a recommended lane generation unit 30T.

The respective functional units (the acquisition unit 30A, the derivation unit 30B, the calculation unit 30C, the setting unit 30D, the record control unit 30E, the sensor abnormality detection unit 30F, the peripheral situation recognition unit 30G, the route generation unit 30H, the driving amount generation unit 30I, the travel lane detection unit 30J, the obstacle detection unit 30K, the sign recognition unit 30L, the travelable region detection unit 30M, the self-position estimation unit 30N, the V2X communication information analysis unit 30O, the driver state recognition unit 30P, the grid map generation unit 30Q, the travel-planned route generation unit 30R, the travel strategy and difficulty determination unit 30S, and the recommended lane generation unit 30T) of the processor 30 are implemented by one or a plurality of processors, for example.

For example, the above-described respective units may be implemented by causing a processor such as the ECU 22 or a central processing unit (CPU) to execute a program, that is, software. The respective functional units described above may be implemented by a processor such as a dedicated integrated circuit (IC), that is, hardware. In addition, the respective functional units described above may be implemented using the software and the hardware in combination. In the case of using the plurality of processors, each of the processors may implement one of the units, or may realize two or more of the units.

Incidentally, the term "processor" used in the present embodiment means, for example, the ECU 22, the CPU, a graphical processing unit (GPU), or an application specific integrated circuit (ASIC), or a circuit of a programmable logic device (for example, a simple programmable logic device (SPLD), a complex programmable logic device (CPLD), and a field programmable gate array (FPGA)).

The processor reads out and executes a program stored in a storage unit such as the storage device 24, thereby realizing the respective functional units described above. Incidentally, it may be configured such that the program is directly incorporated in the circuit of the processor instead of storing the program in the storage unit. In this case, the processor implements the respective functional units described above by reading and executing the program incorporated in the circuit.

First, the acquisition unit 30A will be described. The acquisition unit 30A acquires output information from the sensor 10A.

The output information is information indicating a sensing result obtained by sensing in each of the sensors 10A. In other words, the output information is the information output from the sensor 10A. The output information is, for example, the captured image captured by the camera 10E, the LIDAR information measured by the LIDAR 10F, the millimeter wave radar information measured by the millimeter wave radar 10G, the communication message communicated by the V2X module 10D, the position information acquired by the GNSS module 10P, or the like.

Incidentally, the output information is not limited to the above-described one as long as being information indicating the sensing result obtained by sensing in the sensor 10A connected to the information processing device 20.

The acquisition unit 30A outputs the acquired output information to the derivation unit 30B.

The derivation unit 30B derives derivative information from the output information acquired by the acquisition unit 30A.

The derivative information is information derived by executing various types of processing on the output information. Thus, the derivative information is different from the output information.

The derivative information includes, for example, at least one of sensor abnormality information, contradiction information, driver state information, travel-planned route information, travel difficulty information, recommended lane information, peripheral situation analysis result information, and the driving amount of the moving object 10.

These types of derivative information are derived by the derivation unit 30B. The derivation unit 30B includes a sensor abnormality detection unit 30F, a peripheral situation recognition unit 30G, a route generation unit 30H, and a driving amount generation unit 30I.

The sensor abnormality detection unit 30F derives the sensor abnormality information as derivative information. The sensor abnormality information is information indicating an abnormality of the sensor 10A. The abnormality of the sensor 10A indicates that the sensor 10A is in the state of being incapable of outputting the output information or the state of outputting an abnormal value.

The sensor abnormality detection unit 30F detects an abnormality of each of the sensors 10A. The sensor abnormality detection unit 30F receives output information from each of the sensors 10A via the acquisition unit 30A. Further, the sensor abnormality detection unit 30F detects the abnormality of each of the sensors 10A, which output each piece of output information, using the received output information.

The sensor abnormality detection unit 30F may detect the abnormality of the sensor 10A from the output information using a publicly known method. For example, the sensor abnormality detection unit 30F detects the sensor abnormality using a watchdog function provided in the sensor 10A. In addition, the sensor abnormality detection unit 30F may detect the sensor 10A, which does not output the output information for a predetermined time or longer, as the abnormality. In addition, for example, the sensor abnormality detection unit 30F presets a normal value within a range determined to be normal for each of the sensors 10A. Further, when an output value from each of the sensors 10A is out of the range of the corresponding normal value, the sensor abnormality detection unit 30F may detect that the sensor is in the state of outputting the abnormal value.

Specifically, for example, it is assumed that a pixel region indicating the same measurement results for the number of times corresponding to a threshold or more is included in the captured image obtained from the camera 10E, and the pixel region has the area equal to or larger than a threshold. In this case, the sensor abnormality detection unit 30F detects an abnormality of the camera 10E capturing the captured image.

In addition, for example, it is assumed that a region indicating the same distance for the number of times corresponding to a threshold or more is included in the LIDAR information obtained from the LIDAR 10F, and the region has the area equal to or larger than a threshold. In this case, the sensor abnormality detection unit 30F detects failure of the LIDAR 10F measuring the LIDAR information.

Incidentally, the sensor abnormality detection unit 30F may detect the abnormality of the sensor 10A using another method. For example, the sensor abnormality detection unit 30F may detect the abnormality of the sensor 10A by reading a register managed by the sensor 10A.

Further, when the abnormality has been detected, the sensor abnormality detection unit 30F derives the sensor 10A which has detected the abnormality and the information indicating the abnormality of the sensor 10A as the sensor abnormality information.

Next, the peripheral situation recognition unit 30G will be described. The peripheral situation recognition unit 30G derives the peripheral situation information using the output information received from the sensor 10A via the acquisition unit 30A, as derivative information.

The peripheral situation information is the derivative information derived from the output information and is information indicating a peripheral situation of the moving object 10. The peripheral situation information is not the output information itself that is sensed by the sensor 10A but is information derived by performing certain processing on the output information.

The peripheral situation information includes at least one of the contradiction information, the driver state information, and the peripheral situation analysis result information.

The contradiction information is information indicating that the output information output from each of the plurality of sensors 10A contradicts each other. The driver state information is information indicating a state of a driver of the moving object 10.

The peripheral situation analysis result information is information indicating an analysis result of the periphery of the moving object 10 that is derived by analyzing the output information. The peripheral situation analysis result information is information indicating the analysis result, for example, presence or absence of an object that is positioned in the periphery of the moving object 10, a type of object, a probability of presence of the object, an occupancy rate of the object, or the like. The target is an object to be measured. The target is, for example, a travel lane on which the moving object is currently traveling, an obstacle, a sign, a travelable region, or the like. In addition, the peripheral situation analysis result information may include self-position information indicating a position of the moving object 10 on a map and analysis result information of the communication message. In the present embodiment, the peripheral situation analysis result information includes at least one of the travel lane that the moving object is currently traveling, the obstacle in the periphery of the moving object 10, the sign, the travelable region, the self-position information, the analysis result information of the communication message, and the peripheral situation information.

Incidentally, the peripheral situation analysis result information may be information indicating the analysis result of the periphery of the moving object 10 and may include another piece of information other than the above-described one. For example, the peripheral situation analysis result information may further include at least one of information on a traveling road such as a road shape (a curvature, a width, the number of lanes, or the like), a road structure (a branch, an intersection, or the like), and a road surface situation, information on the other moving object 10 (for example, a position, speed, a type of the moving object 10, or the like), traffic congestion information, information on climate such as weather and temperature, and the like.

The peripheral situation recognition unit 30G includes a travel lane detection unit 30J, an obstacle detection unit 30K, a sign recognition unit 30L, a travelable region detection unit 30M, a self-position estimation unit 30N, a V2X communication information analysis unit 30O, a driver state recognition unit 30P, and a grid map generation unit 30Q.

The travel lane detection unit 30J detects the travel lane on which the moving object 10 is currently traveling using the output information output from the sensor 10A. For example, the travel lane detection unit 30J performs image analysis on the captured image output from the camera 10E, and specifies a white line and a guardrail formed on the road, thereby detecting the travel lane on which the moving object is currently traveling.

Further, the travel lane detection unit 30J outputs the information indicating the detected travel lane to the calculation unit 30C as derivative information. Incidentally, when the travel lane is not detected, the travel lane detection unit 30J may output information indicating an error in detection of the travel lane to the calculation unit 30C as derivative information.

The obstacle detection unit 30K detects an obstacle in the periphery of the moving object 10 using the output information output from the sensor 10A.

For example, the obstacle detection unit 30K performs image analysis on the captured image output from the camera 10E and recognizes an obstacle (a vehicle, a bicycle, a pedestrian, a guardrail, a building, or the like) included in the captured image. Further, the obstacle detection unit 30K detects the obstacle by calculating a distance to the recognized obstacle from the moving object 10 using a publicly known method such as stereo matching.

In addition, the obstacle detection unit 30K may detect the obstacle according to a publicly known method using the LIDAR information output from the LIDAR 10F.

In addition, it is assumed that the obstacle detection unit 30K detects that a distance to an object present in the same direction from the moving object 10 differs between the plurality of sensors 10A (for example, the camera 10E and the LIDAR 10F) by a threshold or more. In this case, the obstacle detection unit 30K derives the contradiction information indicating that the output information output from each of the plurality of sensors 10A indicating these pieces of different output information contradict each other.

Further, the obstacle detection unit 30K outputs the information indicating the obstacle and the contradiction information to the calculation unit 30C as derivative information.

Incidentally, when the obstacle is not detected or when the abnormal obstacle is detected, the obstacle detection unit 30K may further output such information to the calculation unit 30C as derivative information.

The sign recognition unit 30L recognizes the sign using the output information output from the sensor 10A. For example, the sign recognition unit 30L analyzes the captured image output from the camera 10E and recognizes the sign included in the captured image. In addition, the sign recognition unit 30L may specify a traffic rule indicated by the recognized sign.

Further, the sign recognition unit 30L outputs information indicating the detected signs and traffic rule to the calculation unit 30C as derivative information. Incidentally, when the sign is not detected or when a road surface rule described on a road surface or the like is detected, the sign recognition unit 30L may further output such information to the calculation unit 30C as derivative information.

The travelable region detection unit 30M detects a travelable region in the periphery of the moving object 10 using the output information output from the sensor 10A. For example, the travelable region detection unit 30M analyzes the captured image output from the camera 10E and detects the travelable region of the moving object 10. For example, the travelable region detection unit 30M detects a travelable region for each pixel of the captured image using a deep neural network (DNN) or the like.

Specifically, the travelable region detection unit 30M detects the travelable region for each pixel using a scheme such as J. Long, et. al, "Fully Convolutional Networks for Semantic Segmentation", CVPR2015, and V. Badrinarayanan, et. al, "SegNet: A Deep Convolutional Encoder-Decoder Architecture for Robust Semantic Pixel-Wise Labelling" in the DNN.

Further, the travelable region detection unit 30M outputs information indicating the detected travelable region to the calculation unit 30C as derivative information. Incidentally, when the travelable region is not detected or when an abnormal situation is detected as a situation to travel a road, the travelable region detection unit 30M may further output such information to the calculation unit 30C as derivative information.

The self-position estimation unit 30N estimates the position (self-position information) of the moving object 10 on the map. For example, the self-position estimation unit 30N uses the map of the map information received from the outside by the V2X module 10D. Further, the self-position estimation unit 30N estimates a position indicated by the position information acquired from the GNSS module 10P on the map as the position of the moving object 10. At this time, the self-position estimation unit 30N accurately estimates the self-position information indicating the position of the moving object 10 on the map using position information on a traffic infrastructure such as a lane and a traffic signal described in the map, a position of the travel lane detected by the travel lane detection unit 30J, and a position of the sign recognized by the sign recognition unit 30L.

Incidentally, the self-position estimation unit 30N may also estimate speed information of the moving object 10 in combination. For example, the self-position estimation unit 30N may derive the speed information indicating current speed of the moving object 10 using the output information acquired from the camera 10E or the LIDAR 10F.

Further, the self-position estimation unit 30N outputs the estimated self-position information to the calculation unit 30C as derivative information. Incidentally, when the self-position information is not estimated, the self-position estimation unit 30N may further output information indicating an estimation error to the calculation unit 30C as derivative information.

The V2X communication information analysis unit 30O analyzes the communication message in the output information. The V2X communication information analysis unit 30O analyzes the communication message acquired from the V2X module 10D. For example, the V2X communication information analysis unit 30O analyzes position information, size information, movement information (speed, a direction, acceleration in the progressing direction, acceleration in the lateral direction, the yaw angle, and the like), an operation state (an operation amount of a brake, an accelerator, or a steering, a state of a transmission, a state of an auxiliary brake, a state of an ABS, and the like), and the like of another device on a transmission source of the communication message by analyzing the communication message. In addition, the V2X communication information analysis unit 30O analyzes a state of a traffic light (a current color of the traffic light or the like) in the periphery of the moving object 10 and information (a speed limit or the like) on the sign in the periphery of the moving object 10 by analyzing the communication message.

Accordingly, the V2X communication information analysis unit 30O derives analysis result information of the communication message. Further, the V2X communication information analysis unit 30O outputs the analysis result information of the communication message to the calculation unit 30C as derivative information.

That is, the contradiction information and the peripheral situation analysis result information are derived by the travel lane detection unit 30J, the obstacle detection unit 30K, the sign recognition unit 30L, the travelable region detection unit 30M, the self-position estimation unit 30N, and the V2X communication information analysis unit 30O.

Next, the driver state recognition unit 30P will be described. The driver state recognition unit 30P derives the driver state information using the output information received from the sensor 10A. The driver state information is the information indicating the state of the driver of the moving object 10.

For example, the camera 10E that captures a face of a driver driving the moving object 10 is mounted on the moving object 10. Further, the driver state recognition unit 30P derives the driver state information indicating the state of the driver of the moving object 10 by analyzing the face included in the captured image captured by the camera 10E. A publicly known face analysis technology may be used for this analysis. For example, the driver state information is information indicating that the driver closes the eyelids for a time equal to or longer than a threshold, information indicating that the driver gazes at a direction other than the progressing direction for the time equal to or longer than the threshold, information indicating that the driver is absent, information indicating a physical situation of the driver, information indicating a level of alertness of the driver, information indicating a gaze direction of the driver, or the like.

Further, the driver state recognition unit 30P outputs information indicating the state of the driver to the calculation unit 30C as derivative information.

The grid map generation unit 30Q collects the derivative information derived by the other respective functional units included in the peripheral situation recognition unit 30G, thereby generating the peripheral state information.

Figure 4:
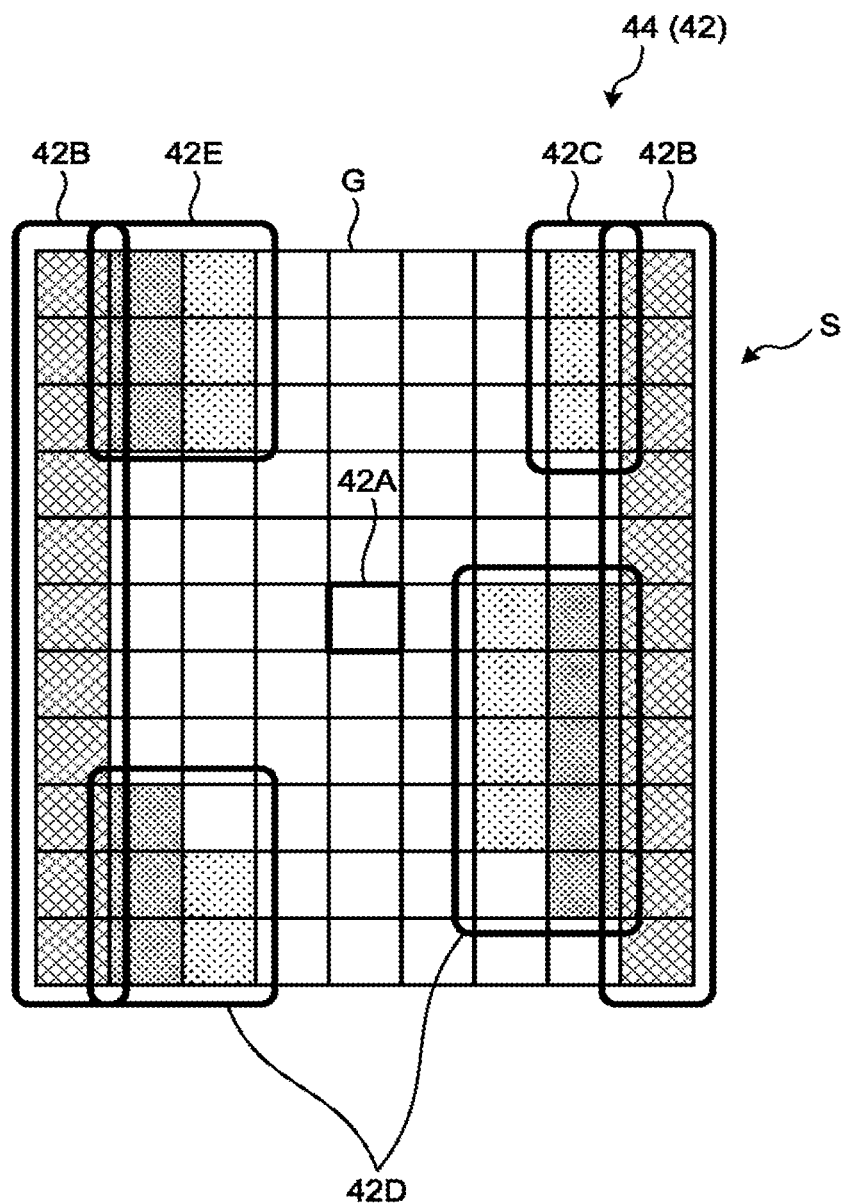
FIG. 4 is a schematic diagram illustrating peripheral situation information.

FIGS. 4 and 5 are schematic diagrams illustrating examples of peripheral situation information 42. The peripheral situation information 42 is information indicating the derivative information (the peripheral situation information (the contradiction information, the driver state information, and the peripheral situation analysis result information (the travel lane on which the moving object is currently traveling, the obstacle, the sign, the travelable region, the self-position information indicating the position of the moving object 10 on the map, and the analysis result information of the communication message))), derived by the travel lane detection unit 30J, the obstacle detection unit 30K, the sign recognition unit 30L, the travelable region detection unit 30M, the self-position estimation unit 30N, the V2X communication information analysis unit 30O, and the driver state recognition unit 30P, collectively for each same timing of sensing.

FIG. 4 illustrates an example of peripheral situation information 44 obtained by indicating the peripheral situation information 42 on the grid map.

The peripheral situation information 44 is obtained by dividing a space in the periphery of the moving object 10 into a plurality of grids G by partitioning the space into a grid shape, and defining information on the peripheral situation information 44 in each of the grids G at a position corresponding to each of the grids G. The peripheral situation information 44 represented by the grid G will be referred to as an occupancy grid map (OGM) in some cases.

For example, in the example illustrated in FIG. 4, the peripheral situation information 44 has a configuration in which a space S in the periphery of the moving object 10 is divided into the plurality of grids G. The peripheral situation information 44 will be referred to as a local map in some cases.

For example, the grid map generation unit 30Q defines the position information of the moving object 10 in a region 42A that is the grid G corresponding to the self-position estimated by the self-position estimation unit 30N in the peripheral situation information 44. In addition, the grid map generation unit 30Q defines information indicating the travel lane in a region 42B corresponding to the travel lane detected by the travel lane detection unit 30J in the peripheral situation information 44. In addition, the grid map generation unit 30Q defines information indicating the obstacle in a region 42D corresponding to the obstacle detected by the obstacle detection unit 30K in the peripheral situation information 44. In addition, the grid map generation unit 30Q defines information indicating another moving object in a region 42E corresponding to another moving object or the like analyzed by the V2X communication information analysis unit 30O in the peripheral situation information 44. In addition, the grid map generation unit 30Q defines information indicating that it is the travelable region in a region 42C corresponding to the travelable region detected by the travelable region detection unit 30M in the peripheral situation information 44.

In addition, the grid map generation unit 30Q may further generate the peripheral situation information 44 obtained by assigning information indicating the probability of presence of the obstacle in the periphery of the moving object 10 to each of the grids G. In the example illustrated in FIG. 4, the grid G having a higher probability of presence of the obstacle is illustrated using a darker color. Incidentally, the peripheral situation information 44 may represent the probability of presence of the obstacle using a numerical value for each of the grids G.

In this manner, the grid map generation unit 30Q generates the peripheral situation information 44.

Incidentally, a data configuration of the peripheral situation information 42 is not limited to the peripheral situation information 44 in the format of the grid map illustrated in FIG. 4. For example, the data configuration of the peripheral situation information 42 may be peripheral situation information 46 having a configuration illustrated in FIG. 5. The peripheral situation information 46 has a data configuration in which position information, speed information, and the like are represented in association with each object in the periphery of the moving object 10.

Further, the grid map generation unit 30Q outputs the peripheral situation information 42 (the peripheral situation information 44 and the peripheral situation information 46) to the calculation unit 30C as derivative information.

Incidentally, there is contradiction in the derivative information, received from the respective functional units (the travel lane detection unit 30J, the obstacle detection unit 30K, the sign recognition unit 30L, the travelable region detection unit 30M, the self-position estimation unit 30N, and the V2X communication information analysis unit 30O), with respect to the grid G at the same position in some cases. For example, there is a case where the travel lane detected by the travel lane detection unit 30J and the travelable region detected by the travelable region detection unit 30M do not overlap each other by the area equal to or larger than a threshold, or the like. In such a case, the grid map generation unit 30Q also outputs information indicating this contradiction to the calculation unit 30C as derivative result.

Returning to FIG. 3, the description will be continued. Next, the route generation unit 30H will be described. The route generation unit 30H generates information on the travel-planned route of the moving object 10 as derivative information. The route generation unit 30H generates information on the travel-planned route using, for example, a publicly known reference path scheme or the like.

In the present embodiment, the route generation unit 30H includes the travel-planned route generation unit 30R, the travel strategy and difficulty determination unit 30S, and the recommended lane generation unit 30T. The travel-planned route generation unit 30R, the travel strategy and difficulty determination unit 30S, and the recommended lane generation unit 30T will be referred to as a high level planner, a middle level planner, and a low level planner, respectively.

The travel-planned route generation unit 30R generates the travel-planned route information of the moving object 10 using the output information acquired from the sensor 10A via the acquisition unit 30A. The travel-planned route information is information indicating a route along which the moving object 10 is planned to travel.

For example, the travel-planned route generation unit 30R generates the travel-planned route information, which indicates a planned route along which the moving object 10 travels until reaching a destination, using the peripheral situation information 44 (see FIG. 4) generated by the grid map generation unit 30Q. Incidentally, the travel-planned route generation unit 30R may generate the travel-planned route information from the current position of the moving object 10 to the destination using a publicly known method.

The travel strategy and difficulty determination unit 30S generates travel strategy information and travel difficulty information. The travel strategy information is information indicating a travel strategy when the moving object travels along the travel-planned route indicated by the travel-planned route information. The travel difficulty information is information indicating a travel difficulty of the travel-planned route indicated by the travel-planned route information.

The travel strategy and difficulty determination unit 30S defines the travel strategy and the travel difficulty corresponding to a determination reference in advance. For example, the travel strategy and difficulty determination unit 30S stores a reference management table in advance.

FIG. 6 is a schematic diagram illustrating an example of a reference management table 40. The reference management table 40 is obtained by associating determination reference information, travel strategy information, and travel difficulty information with each other.

The determination reference information is information indicating the determination reference of the travel strategy information and the travel difficulty information with respect to the travel-planned route indicated by the travel-planned route information. The travel strategy and difficulty determination unit 30S may generate and store the reference management table 40 in advance. In addition, the reference management table 40 may be changeable as appropriate. Incidentally, the travel difficulty having a greater value indicated by the travel difficulty information indicates that it is more difficult to travel.

The travel strategy and difficulty determination unit 30S specifies the determination reference information indicated in the reference management table 40 corresponding to the travel-planned route indicated by the travel-planned route information generated by the travel-planned route generation unit 30R. Further, the travel strategy and difficulty determination unit 30S reads the travel strategy information and the travel difficulty information corresponding to the specified determination reference information in the reference management table 40. Accordingly, the travel strategy and difficulty determination unit 30S determines the travel strategy information and the travel difficulty information with respect to the travel-planned route information generated by the travel-planned route generation unit 30R.

Incidentally, the travel strategy and difficulty determination unit 30S is not limited to a scheme of determining the travel strategy information and the travel difficulty information using the reference management table 40. For example, the travel strategy and difficulty determination unit 30S may recognize a current traffic situation using a deep neural network (DNN) system and determine the travel strategy information and the travel difficulty information depending on the recognition result.

The recommended lane generation unit 30T generates recommended lane information. The recommended lane information is information indicating a detailed lane, such as a travel lane (lane), a right turn lane, and a left turn lane, for the travel-planned route indicated by the travel-planned route information.

In detail, the recommended lane generation unit 30T generates the recommended lane information so as to avoid collision with the whole obstacle considering the travel strategy information and the travel difficulty information determined by the travel strategy and difficulty determination unit 30S for the travel-planned route indicated by the travel-planned route information generated by the travel-planned route generation unit 30R. At this time, the recommended lane generation unit 30T may generate the recommended lane information further considering a level of safety and a level of comfort. The level of safety may be calculated from the distance between the moving object 10 and the obstacle, the speed of the moving object 10, and the like. The level of comfort may be calculated from the acceleration of the moving object 10.

Returning to FIG. 3, the description will be continued. The driving amount generation unit 30I generates the driving amount of the moving object 10 as derivative information. The driving amount of the moving object 10 is information configured to control the drive unit 10M of the moving object 10. Specifically, the driving amount of the moving object 10 is the steering amount, the brake amount, the acceleration amount, and the like.

In the present embodiment, the driving amount generation unit 30I generates the driving amount (the steering amount, the brake amount, or the acceleration amount), configured to travel along the recommended lane indicated by the recommended lane information generated by the recommended lane generation unit 30T, in the travel-planned route information generated by the travel-planned route generation unit 30R.

In this manner, the respective functional units included in the derivation unit 30B derive the derivative information from the output information of the sensor 10A. That is, the derivation unit 30B derives the derivative information including at least one of the sensor abnormality information, the contradiction information, the driver state information, the travel-planned route information, the travel strategy information, the travel difficulty information, the recommended lane information, the peripheral situation analysis result information, and the driving amount of the moving object 10 from the output information of the sensor 10A in the present embodiment. In addition, the peripheral situation analysis result information includes at least one of the travel lane on which the moving object is currently traveling, the obstacle in the periphery of the moving object 10, the sign, the travelable region, the self-position information, the speed information, the analysis result information of the communication message, and the peripheral situation information 42 in the present embodiment.

Next, the calculation unit 30C will be described.

The calculation unit 30C calculates a reliability depending on the derivative information. The reliability indicates a degree of reliability in the derivative information.

For example, the calculation unit 30C calculates the low reliability with respect to derivative information as the derivative information is information indicating a state that causes trouble in automatic traveling of the moving object 10. Incidentally, the "low reliability" means to be lower than a reliability as a reference set in advance.

The state that causes trouble in automatic traveling is, for example, a state where the probability of occurrence of an accident is high. For example, the state that causes trouble in automatic traveling is a state where an obstacle is present within a range where a distance from the moving object 10 is equal to or shorter than a threshold. In addition, for example, the state that causes trouble in automatic traveling is a state where an obstacle is present within a range equal to or shorter than a threshold of a route on which the moving object 10 automatically travels. A level of the state indicating occurrence of trouble in automatic traveling may be set in advance depending on content of derivative information. Further, the calculation unit 30C may calculate a lower reliability with respect to derivative information as the level of the state, which corresponds to content of the derivative information, indicating the state causing trouble in automatic traveling is higher.

For example, the level of the state indicating occurrence of trouble in automatic traveling becomes a higher level, as the distance between the moving object 10 and the obstacle is closer, as the distance to the obstacle present in the progressing direction is shorter, or as the number of obstacles present within the distance equal to or shorter than a threshold is larger.

In addition, for example, the calculation unit 30C calculates the low reliability as the derivative information is information indicating an abnormal state. The abnormal state indicates an abnormality of the sensor 10A or a state different from a state set in advance as a normal state. For example, the abnormal state is a case where the output information output from the sensor 10A and the derivative information derived from the output information indicate the abnormality of the sensor 10A. In addition, for example, the abnormal state is a case where the driver state information indicating the state of the driver of the moving object 10 indicates a state where it is difficult for the driver to drive. A level of the abnormal state may be set in advance depending on content of derivative information. Further, the calculation unit 30C may calculate the lower reliability with respect to derivative information as the level of the abnormal state, which corresponds to the content of the derivative information, is higher.

The level of the abnormal state becomes a high level, for example, as the output information from the sensor 10A is hardly obtained or as at least a part of the output information from the sensor 10A is abnormal information.

The information in which at least a part of the output information from the sensor 10A is abnormal means information indicating that a part of a color captured image is always monochrome or information indicating that distance information in a specific direction in the output information obtained by the LIDAR 10F is always constant, a watchdog detection error, or the like. In addition, the information in which at least a part of the output information from the sensor 10A is abnormal is information indicating that a white region (overexposed region) in a color captured image is equal to or larger than a threshold, information indicating that a black region is equal to or larger than a threshold, information indicating that the LIDAR 10F has not detected an object, or the like.

Incidentally, the calculation unit 30C may calculate the reliability depending on the derivative information and a driving mode of the moving object 10. The driving mode indicates a level of automatic driving of the moving object 10. For example, the Japanese government and the National Highway Traffic Safety Administration (NHTSA) of America illustrate the level of automatic driving in four levels including level 0 to level 4. In level 0, the driver always operates all control systems. Thus, it can be said that level 0 is a mode of non-automatic driving. Further, the level of the automatic driving shifts from level 1 to level 4 in a stepwise manner toward complete automation without involving driver's operation.

For example, the calculation unit 30C acquires the driving mode of the moving object 10 from the drive control unit 10I. Further, the calculation unit 30C corrects a record level calculated from the derivative information such that the record level becomes higher as the level of automatic driving indicated by the driving mode is higher. Accordingly, the calculation unit 30C may calculate the reliability depending on the derivative information and the driving mode of the moving object 10.

In this manner, the calculation unit 30C calculates the reliability of the derivative information according to the above-described calculation condition of the reliability. The calculation condition of the reliability is to calculate the low reliability as the derivative information is the information indicating the state causing trouble in automatic traveling of the moving object 10 or is the information indicating the abnormal state, or to calculate the reliability depending on the derivative information and the driving mode of the moving object 10.

Incidentally, the calculation unit 30C may calculate the same record level with respect to a plurality of pieces of derivative information derived by the derivation unit 30B. That is, the calculation unit 30C may calculate one record level with respect to the plurality of pieces of derivative information derived by the derivation unit 30B.

In addition, the calculation unit 30C may calculate a record level according to each piece of derivative information for each of the plurality of pieces of derivative information derived by the derivation unit 30B. That is, the derivative information derived by the derivation unit 30B includes a plurality of pieces of item derivative information according to items. The items indicate types of derivative information.

Here, as described above, the derivation unit 30B derives the derivative information including at least one of the sensor abnormality information, the contradiction information, the driver state information, the travel-planned route information, the travel strategy information, the travel difficulty information, the recommended lane information, the peripheral situation analysis result information, and the driving amount of the moving object 10 from the output information of the sensor 10A in the present embodiment. In addition, the peripheral situation analysis result information includes at least one of the travel lane on which the moving object is currently traveling, the obstacle in the periphery of the moving object 10, the sign, the travelable region, the self-position information, the speed information, the analysis result information of the communication message, and the peripheral situation information 42 in the present embodiment.

Thus, the item derivative information specifically indicates each piece of the sensor abnormality information, the contradiction information, the driver state information, the travel-planned route information, the travel strategy information, the travel difficulty information, the recommended lane information, the driving amount of the moving object 10, the travel lane on which the moving object is currently traveling, the obstacle in the periphery of the moving object 10, the sign, the travelable region, the self-position information, the analysis result information of the communication message, and the peripheral situation information 42.

Further, the calculation unit 30C calculates the reliability of the item derivative information for each piece of item derivative information.

The calculation unit 30C may calculate the reliability of the item derivative information for each piece of item derivative information according to the above-described calculation condition of the reliability. That is, for example, the calculation unit 30C calculates the low reliability with respect to item derivative information as the item derivative information is information indicating the state causing trouble in automatic traveling of the moving object 10 or information indicating the abnormal state. In addition, the calculation unit 30C calculates the reliability with respect to the item derivative information depending on the item derivative information and the driving mode of the moving object 10.

The calculation of the reliability with respect to the item derivative information will be described with a specific example.

For example, the calculation unit 30C calculates the lower reliability with respect to information indicating a travel lane as a distance between the travel lane detected by the travel lane detection unit 30J and the self-position indicated by the self-position information of the moving object 10 is closer.

In addition, the calculation unit 30C calculates the lower reliability with respect to the information indicating the detection result of an obstacle as the distance to the obstacle detected by the obstacle detection unit 30K is shorter, or as the probability that the type of the obstacle is not specified is higher.

In addition, the calculation unit 30C calculates the low reliability as the sign recognized by the sign recognition unit 30L and a traffic rule indicated by the sign are information indicating caution warning. For example, when the calculation unit 30C calculates the low reliability with respect to information indicating a sign when the sign indicates caution warning, soft shoulder, or the like. In addition, when a change of a signal color is recognized by the sign recognition unit 30L while the moving object 10 is traveling at an intersection, the calculation unit 30C also calculates the low reliability with respect to information indicating the sign.

In addition, the calculation unit 30C calculates the lower reliability as the self-position indicated by the self-position information of the moving object 10 is closer to the travelable region detected by the travelable region detection unit 30M.

In addition, the calculation unit 30C calculates the low reliability with respect to the self-position information derived by the self-position estimation unit 30N when there is no map information for estimation of the self-position information.

In addition, the calculation unit 30C calculates the low reliability with respect to a communication message as analysis result information of the communication message obtained by the V2X communication information analysis unit 30O is information with a high probability of occurrence of travel trouble such as an accident.

In addition, for example, the calculation unit 30C calculates the low reliability with respect to a communication message as analysis result information of the communication message is information with a high security risk, such as information indicating an illegal packet.

In addition, for example, the calculation unit 30C calculates the low reliability with respect to driver state information as the driver state information is information indicating the abnormal state. In addition, for example, the calculation unit 30C calculates the low reliability when the travel-planned route indicated by the travel-planned route information includes a region within a distance equal to or shorter than a threshold from the obstacle.

In addition, for example, the calculation unit 30C calculates the low reliability with respect to travel difficulty information as the travel difficulty information indicates a difficulty equal to or higher than a threshold. In addition, for example, the calculation unit 30C calculates the low reliability with respect to recommended lane information when a recommended lane indicated by the recommended lane information includes a region within a distance equal to or shorter than a threshold from the obstacle.

In addition, for example, the calculation unit 30C calculates the low reliability with respect to sensor abnormality information as the sensor abnormality information indicates an abnormal value.

In addition, the calculation unit 30C calculates the low reliability with respect to contradiction information. In addition, the calculation unit 30C calculates the lower reliability as contradiction indicated by the contradiction information is greater.

Specifically, there is a case where any obstacle is not detected based on the output information from the LIDAR 10F, but the obstacle is detected based on the output information from the camera 10E for the same direction or position in the periphery of the moving object 10. In addition, there is a case where different objects are captured in captured images obtained from the plurality of cameras 10E, respectively, with respect to the same capturing region in the external world. In addition, there is a case where there is contradiction between the output information from the ultrasonic sensor 10H and the output information from the LIDAR 10F or the camera 10E, for the same direction or position in the periphery of the moving object 10. In addition, there is a case where a deviation equal to or greater than a threshold occurs between the travel lane detected by the travel lane detection unit 30J and the travelable region detected by the travelable region detection unit 30M. In addition, there is a case where an obstacle indicated by the analysis result information of the communication message obtained by the V2X communication information analysis unit 30O does not match an obstacle detected by the obstacle detection unit 30K.

In such a case, contradiction information is derived as derivative information by the derivation unit 30B. The calculation unit 30C calculates the low reliability with respect to such contradiction information.

Incidentally, the calculation unit 30C may set a reference reliability as a reference in advance and adds or subtracts a predetermined change value to or from the reference reliability according to the item derivative information, thereby calculating the reliability with respect to the item derivative information.

In addition, the calculation unit 30C may set a change value of a reliability, in advance, corresponding to the content indicated by the item derivative information, and calculate the reliability according to the set change value.

In this case, the calculation unit 30C stores the item derivative information and the change value of the reliability in advance in association with each other. The calculation unit 30C may set a value that conforms to the above-described calculation condition of the reliability, in advance, as the change value of the reliability.

Figure 7:
FIG. 7 is a schematic diagram illustrating a reliability correspondence DB.

FIG. 7 is a schematic diagram illustrating an example of a reliability correspondence DB 50. The reliability correspondence DB 50 is a database that defines the change value of the reliability corresponding to the output information and the derivative information. In FIG. 7, the change value of the reliability is illustrated as a positive value or a negative value. The negative change value indicates a value to change the reliability to be lower. The positive change value indicates a value to change the reliability to be higher. Incidentally, a data configuration of the reliability correspondence DB 50 is not limited to the database.

For example, the calculation unit 30C stores the reliability correspondence DB 50 in advance. Further, the calculation unit 30C reads the change value of the reliability corresponding to the item derivative information from the reliability correspondence DB 50. Further, the calculation unit 30C may calculate a reliability corresponding to item derivative information by adding the read change value of the reliability to the reference reliability.

Returning to FIG. 3, the description will be continued. Next, the setting unit 30D will be described.

The setting unit 30D sets a record level of history information according to the reliability of the derivative information derived from the output information of the sensor 10A.

The history information includes at least one of the output information of the sensor 10A and the derivative information.

The record level indicates a level at which the history information is recorded in the storage device 24. The record level indicates the amount of data recorded per unit time. Thus, the amount of data of the derivative information, recorded in the storage device 24 per unit time, increases as the record level becomes higher. In addition, the amount of data of the derivative information, recorded in the storage device 24 per unit time, decreases as the record level becomes lower.

In the present embodiment, the record level is represented by at least one of record object information indicating whether or not information is the object to be recorded, record detail level, a record interval, and a storage period.

The record detail level indicates a level of detail of recorded content at the time of recording the corresponding derivative information (or item derivative information) in the storage device 24. The record detail level is represented by, for example, resolution or the data amount.

The record interval indicates the record interval at the time of recording the corresponding derivative information (or item derivative information) in the storage device 24. The record interval may be one obtained by representing the record interval by time, or may be represented by information indicating to be long or to be short relative to a reference record interval (record interval "medium").

The storage period indicates a period from record of the corresponding derivative information (or item derivative information) in the storage device 24 to erase thereof.

For example, the setting unit 30D acquires the reliability with respect to the derivative information from the calculation unit 30C. Further, the setting unit 30D sets a higher record level as the reliability becomes lower. That is, the setting unit 30D sets the record level so as to satisfy at least one of record object information indicating that information is the object to be recorded, a higher record detail level, a shorter record interval, and a longer record period as the reliability is lower.

In the present embodiment, the setting unit 30D sets the record level according to the reliability of item derivative information for each piece of the item derivative information corresponding to each of the plurality of items.

For example, the setting unit 30D stores the record level corresponding to the reliability in advance. FIG. 8 is a schematic diagram illustrating an example of a data configuration of a record level correspondence DB 52. The record level correspondence DB 52 is obtained by associating the reliability and the record level with each other. The record level for the reliability may be registered, in advance, in the record level correspondence DB 52 such that the lower record level is indicated as the reliability is higher.

Further, the setting unit 30D reads the corresponding record level for the reliability, calculated for each piece of item derivative information in the calculation unit 30C, from the record level correspondence DB 52. Accordingly, the setting unit 30D sets the record level for each piece of item derivative information.

Incidentally, the setting unit 30D may set a function to derive the record level from the reliability in advance and set the record level using the function.

In addition, the setting unit 30D may store a current reliability and a current record level in association with each piece of item derivative information. Further, the setting unit 30D may store a newly set record level and a reliability corresponding to the newly set record level in association with the item derivative information whenever setting a new record level. Accordingly, the setting unit 30D may overwrite and store the "current reliability" and the "current record level" for each piece of item derivative information.

As described above, the setting unit 30D sets the record level for the item derivative information.

Incidentally, the setting unit 30D may also set the record level with respect to the output information used to derive the item derivative information.

In this case, the setting unit 30D may set the record level set for the item derivative information with respect to the output information used to derive the item derivative information.

The setting unit 30D may also set a record level different from the record level set for the item derivative information with respect to the output information used to derive the item derivative information. In this case, for example, the setting unit 30D may set a record level of output information depending on content of item derivative information, a type of the output information used to derive the item derivative information, and content of the output information. In addition, the setting unit 30D may set a value, obtained by correcting a record level set for item derivative information depending on the content of the item derivative information and the content and type of output information used to derive the item derivative information, as the record level of the output information.

In this case, for example, the setting unit 30D may set the record level corresponding to the derivative information and the output information in advance. FIG. 9 is a schematic diagram illustrating an example of an output information correspondence DB 54. The output information correspondence DB 54 defines the record level corresponding to the derivative information and the output information.

For example, it is assumed that output information used to derive item derivative information "advance" of an item "recommended lane information" is from the sensor 10A (for example, the camera 10E1 and the LIDAR 10F1) that senses the front side of the moving object 10 and the sensor 10A (the camera 10E2 and the LIDAR 10F2) that senses the rear side thereof. In this case, the setting unit 30D sets a record level indicating a record detail level "high resolution" and a record interval "short" with respect to the output information from the sensor 10A (the camera 10E1 and the LIDAR 10F1) that senses the front side. In addition, the setting unit 30D sets a record level indicating a record detail level "low resolution" and a record interval "long" with respect to the output information from the sensor 10A (the camera 10E2 and the LIDAR 10F2) which senses the rear side.

In addition, for example, it is assumed that output information used to derive item derivative information "back" of the item "recommended lane information" is from the sensor 10A (for example, the camera 10E1 and the LIDAR 10F1) that senses the front side of the moving object 10 and the sensor 10A (the camera 10E2 and the LIDAR 10F2) that senses the rear side thereof. In this case, the setting unit 30D sets a record level indicating the record detail level "low resolution" and the record interval "long" with respect to output information from the sensor 10A (the camera 10E1 and the LIDAR 10F1) that senses the front side. In addition, the setting unit 30D sets a record level indicating the record detail level "high resolution" and the record interval "short" with respect to the output information from the sensor 10A (the camera 10E2 and the LIDAR 10F2) that senses the rear side.

In addition, for example, it is assumed that output information used to derive item derivative information "right turn lane" of the item "recommended lane information" is from the sensor 10A (for example, the camera 10E1 and the LIDAR 10F1) that senses the front side of the moving object 10. In this case, the setting unit 30D sets the record level indicating a record detail level "high resolution (right side region)" and the record interval "short" with respect to the output information from the sensor 10A (the camera 10E1 and the LIDAR 10F1) that senses the front side. Incidentally, the high resolution (right side region) means that a region corresponding to a right side of an angle of view in the output information (for example, the captured image) from the sensor 10A is recorded at a resolution higher than a reference.

In addition, for example, it is assumed that output information used to derive item derivative information "left turn lane" of the item "recommended lane information" is from the sensor 10A (for example, the camera 10E1 and the LIDAR 10F1) that senses the front side of the moving object 10. In this case, the setting unit 30D sets the record level indicating a record detail level "high resolution (left side region)" and the record interval "short" with respect to the output information from the sensor 10A (the camera 10E1 and the LIDAR 10F1) that senses the front side. Incidentally, the high resolution (left side region) means that a region corresponding to a left side of an angle of view in the output information (for example, the captured image) from the sensor 10A is recorded at a resolution higher than a reference.

In this manner, the setting unit 30D may set the record level such that the record detail level becomes high or low only for a specific region in the angle of view indicated by the output information obtained from each of the sensors 10A.

In addition, for example, it is assumed that output information used to derive item derivative information "expressway" of an item "travel lane" is from the sensor 10A (for example, the camera 10E1 and the LIDAR 10F1) that senses the front side of the moving object 10 and the sensor 10A (the camera 10E2 and the LIDAR 10F2) that senses the rear side thereof. In this case, the setting unit 30D sets a record level indicating a record detail level "high resolution" and a record interval "short" with respect to the output information from the sensor 10A (the camera 10E1 and the LIDAR 10F1) that senses the front side. In addition, the setting unit 30D sets a record level indicating the record detail level "reference resolution" and the record interval "medium" with respect to the output information from the sensor 10A (the camera 10E2 and the LIDAR 10F2) that senses the rear side. The reference resolution is a resolution lower than the high resolution and higher than the low resolution.

In addition, for example, it is assumed that output information used to derive item derivative information "general road" of an item "travel lane" is from the sensor 10A (for example, the camera 10E1 and the LIDAR 10F1) that senses the front side of the moving object 10 and the sensor 10A (the camera 10E2 and the LIDAR 10F2) that senses the rear side thereof. In this case, the setting unit 30D sets the record level indicating a record detail level "only detection point at distance equal to or shorter than threshold" and the record interval "medium" with respect to the output information from the sensor 10A (the camera 10E1 and the LIDAR 10F1) that senses the front side and the sensor 10A (the camera 10E2 and the LIDAR 10F2) that senses the rear side. The record detail level "only detection point at distance equal to or shorter than threshold" means to extract and record only a sensing result in which a distance from the sensor 10A is the distance equal to or shorter than the threshold among the output information (the captured image and the LIDAR information).

In addition, for example, it is assumed that the output information used to derive item derivative information "high speed" of an item "speed information" is from the camera 10E and the LIDAR 10F. In this case, the setting unit 30D sets the record level indicating the record detail level "high resolution" and the record interval "short" with respect to the output information from these camera 10E and LIDAR 10F.

In addition, for example, it is assumed that the output information used to derive item derivative information "low speed" of the item "speed information" is from the camera 10E and the LIDAR 10F. In this case, the setting unit 30D sets the record detail level "only detection point at distance equal to or shorter than threshold" for the output information from these camera 10E and LIDAR 10F.

In this manner, the setting unit 30D may set the record level of the output information depending on the content of the item derivative information, the type of the output information used to derive the item derivative information, and the content of the output information. In addition, the setting unit 30D may perform setting such that the high resolution or the low resolution is set only for a specific region within a measurement range (for example, the angle of view) of the sensor 10A as the record detail level.

Returning to FIG. 3, the description will be continued. Next, the record control unit 30E will be described.

The record control unit 30E performs control to store the history information in the storage device 24 according to the record level set by the setting unit 30D.

In the present embodiment, the record control unit 30E performs control to store the item derivative information, the item derivative information and the output information used to derive the item derivative information, or the output information used to derive the item derivative information in the storage device 24 according to the record level set according to the reliability of the item derivative information.

For example, it is assumed that the setting unit 30D sets the record object information indicating whether or not information is the object to be recorded, the record detail level, the record interval, and the storage period, as the record level.

In this case, the record control unit 30E determines whether or not information is the object to be recorded based on the record level for the item derivative information corresponding to the set record level. Further, when the information is the object to be recorded, the record control unit 30E controls the item derivative information of the record detail level indicated in the record level to be stored in the storage device 24 at the record interval indicated in the record level.

In addition, the record control unit 30E erases the item derivative information stored in the storage device 24 from the storage device 24 when the storage period indicated in the record level set in the item derivative information has passed.

Incidentally, when the output information is stored in the storage device 24 according to the record level set according to the reliability of the item derivative information, the record control unit 30E may perform the following control. The record control unit 30E determines whether or not the information is the object to be recorded based on the record level for the output information used to derive the item derivative information corresponding to the set record level. Further, when the information is the object to be recorded, the record control unit 30E controls the output information of the record detail level indicated in the record level to be stored in the storage device 24 at the record interval indicated in the record level.

In addition, the record control unit 30E erases the output information stored in the storage device 24 from the storage device 24 when the storage period indicated in the record level set in the item derivative information derived from the output information has passed.

Incidentally, there is a case where the information processing device 20 includes the plurality of storage devices 24 (for example, the storage device 24A, the storage device 24B, the storage device 24C, and the like) as illustrated in FIG. 2. In this case, the record control unit 30E may perform the above-described storage control for the storage device 24 (for example, the storage device 24A, the storage device 24B, or the storage device 24 C), which stores the item derivative information as the record object and the output information as the record object according to the record level.

Next, an example of a procedure of information processing, which is executed by the information processing device 20 according to the present embodiment, will be described.

Figure 10:
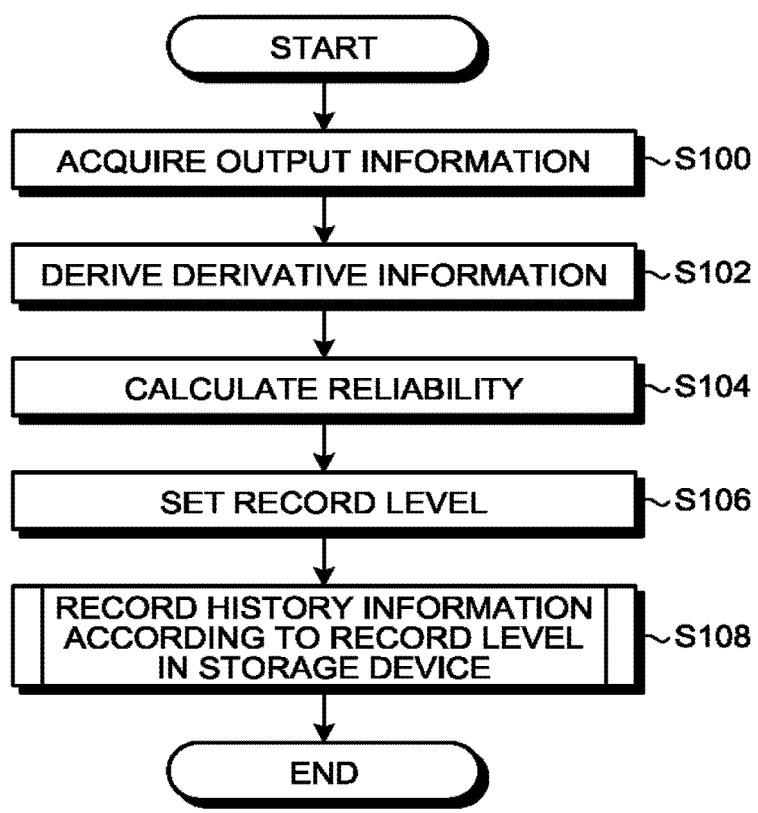
FIG. 10 is a flowchart illustrating a procedure of information processing.

FIG. 10 is a flowchart illustrating the example of the procedure of information processing executed by the information processing device 20 according to the present embodiment. The processor 30 of the information processing device 20 repeatedly executes the procedure illustrated in FIG. 10 every time set in advance. For example, the processor 30 repeatedly executes the information processing procedure illustrated in FIG. 10 at intervals equal to or shorter than a minimum value of a sensing interval of the sensor 10A.

First, the acquisition unit 30A acquires output information from the sensor 10A (Step S100). Next, the derivation unit 30B derives derivative information from the output information acquired in Step S100 (Step S102).

Next, the calculation unit 30C calculates a reliability with respect to the derivative information derived in Step S102 (Step S104). As described above, for example, the calculation unit 30C calculates the reliability for each piece of item derivative information included in the derivative information.

Next, the setting unit 30D sets a record level of the derivative information according to the reliability of the derivative information calculated in Step S104 (Step S106). As described above, for example, the setting unit 30D sets the record level of the item derivative information according to the reliability of the item derivative information.

Next, the record control unit 30E performs a record control process to record history information in the storage device 24 according to the record level set in Step S106 (Step S108). Details of the process of Step S108 will be described later. Further, this routine is ended.

Figure 11:
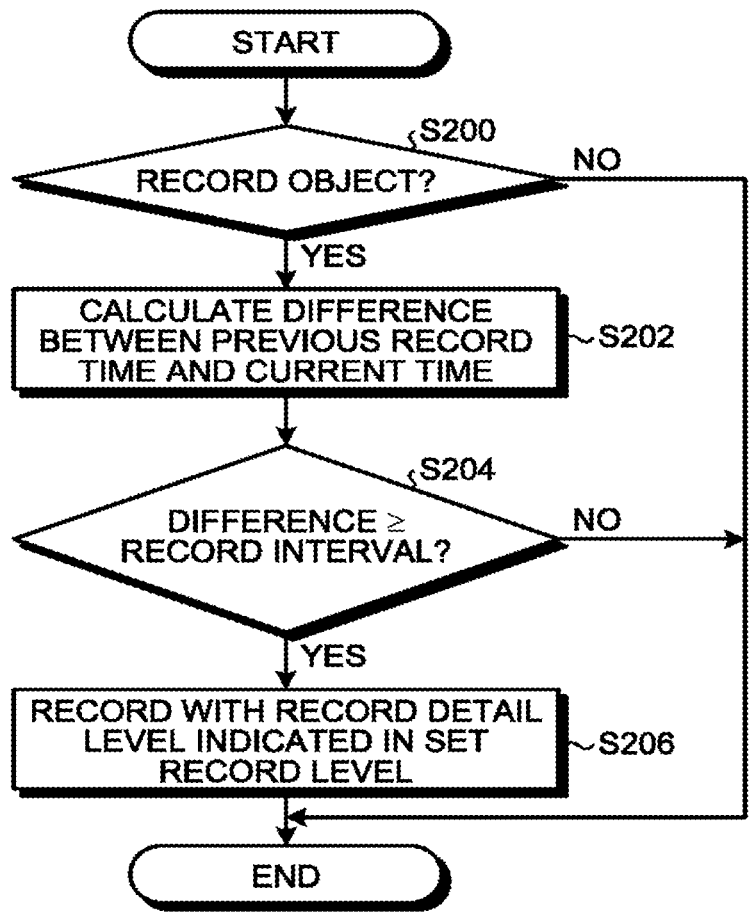
FIG. 11 is a flowchart illustrating a procedure of storage control processing.

Next, the record control process in Step S108 of FIG. 10 will be described. FIG. 11 is a flowchart illustrating an example of a procedure of a storage control process executed by the record control unit 30E. In addition, FIG. 11 illustrates the procedure in a case where the record control unit 30E stores item derivative information in the storage device 24.

The record control unit 30E executes the storage control process illustrated in FIG. 11 for each piece of item derivative information derived by the derivation unit 30B. In detail, the record control unit 30E first determines whether or not the item derivative information is the object to be recorded (Step S200). The record control unit 30E performs the determination in Step S200 by reading information, which indicates whether or not the information is the object to be recorded, indicated in the record level set for the item derivative information. When it is determined to be negative in Step S200 (Step S200: No), this routine is ended. When it is determined to be positive in Step S200 (Step S200: Yes), the process proceeds to Step S202.

In Step S202, the record control unit 30E calculates a difference between a record time previously recorded in the storage device 24 and a current time for the item derivative information (Step S202). Further, the record control unit 30E determines whether or not the calculated difference is equal to or shorter than a record interval indicated by the record level set in the item derivative information (Step S204). When it is determined to be negative in Step S204 (Step S204: No), this routine is ended. When it is determined to be positive in Step S204 (Step S204: Yes), the process proceeds to Step S206.

In Step S206, the record control unit 30E stores the item derivative information in the storage device 24 with a record detail level indicated in the record level set for the item derivative information (Step S206). Further, this routine is ended.

Figure 12:
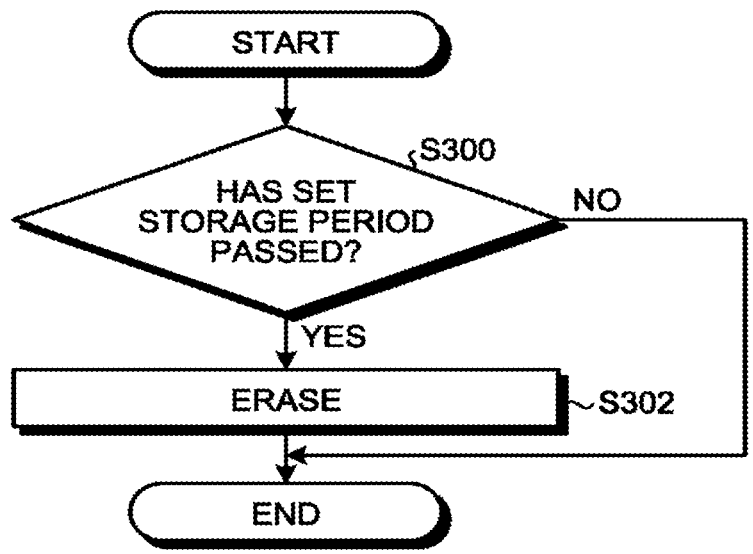
FIG. 12 is a flowchart illustrating an example of a procedure of an interrupt process.

Incidentally, the record control unit 30E may execute an interrupt process at predetermined time intervals. FIG. 12 is a flowchart illustrating an example of a procedure of the interrupt process executed by the record control unit 30E.

The record control unit 30E executes the interrupt process illustrated in FIG. 12 for each piece of item derivative information derived by the derivation unit 30B.

First, the record control unit 30E determines whether or not a storage period set in item derivative information has passed for the item derivative information stored in the storage device 24 (Step S300). When it is determined to be negative in Step S300 (Step S300: No), this routine is ended. When it is determined to be positive in Step S300 (Step S300: Yes), the process proceeds to Step S302.

In Step S302, the record control unit 30E erases the item derivative information that has been determined to be positive in Step S300 from the storage device 24 (Step S302). Accordingly, the record control unit 30E can erase the item derivative information, from the storage device 24, for which the storage period according to the record level has passed among the item derivative information recorded in the storage device 24. Further, this routine is ended.

As described above, the setting unit 30D of the information processing device 20 according to the present embodiment sets the record level of the history information according to the reliability of the derivative information derived from the output information of the sensor 10A.

Therefore, the information processing device 20 according to the present embodiment can appropriately record the history information.

In particular, the information processing device 20 according to the present embodiment can be suitably applied to the moving object 10 that performs automatic driving. In the moving object 10 that performs automatic driving, various types of derivative information are derived in order to perform autonomous traveling. The information processing device 20 according to the present embodiment sets the record level of the history information such as the derivative information and the output information according to the reliability of the derivative information derived from the output information, instead of the output information from the sensor 10A.

In this manner, it is possible to set the record level with respect to the history information using the derivative information derived from the output information instead of the output information, which is the information directly obtained from the sensor 10A, in the information processing device 20 according to the present embodiment.

Therefore, the information processing device 20 according to the present embodiment can appropriately record the history information.

The information processing device 20 according to the above-described embodiment includes a control device such as a CPU, a storage device such as a read only memory (ROM), a random access memory (RAM), and a hard disk drive (HDD), an I/F unit which is an interface with various devices, an output unit which outputs various types of information such as the output information, an input unit which receives operation by a user, and a bus which connects the respective units, and has a hardware configuration utilizing a general computer.

In the information processing device 20 according to the above-described embodiment, the above-described respective functional units are implemented on the computer by the processor such as the ECU 22 reading and executing the program from the ROM on the RAM.

Incidentally, the program configured to execute the above-described respective processes executed by the information processing device 20 according to the above-described embodiment may be stored in the HDD or the like. In addition, the program configured to execute the above-described respective processes executed by the information processing device 20 according to the above-described embodiment may be provided in the state of being incorporated in the ROM in advance.

In addition, the program configured to execute the above-described processes executed by the information processing device 20 according to the above-described embodiment may be stored, as a file in an installable format or an executable format, in a computer-readable storage medium such as a CD-ROM, a CD-R, a memory card, a digital versatile disk (DVD), and a flexible disk (FD) and provided as a computer program product. In addition, the program configured to execute the above-described processes executed by the information processing device 20 according to the above-described embodiment may be stored in a computer connected to a network such as the Internet and provided through download via the network. In addition, the program configured to execute the above-described processes executed by the information processing device 20 according to the above-described embodiment may be provided or distributed via the network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An information processing device comprising:
a storage device; and
one or more processors configured to perform:
acquiring a driving mode indicating a level of autonomous driving of a moving object, the driving mode including a non-autonomous driving mode and autonomous driving modes;
performing setting by correcting a first record level calculated based on a travel-planned route for the moving object to autonomously travel according to a first autonomous driving mode, to a second record level when the driving mode is switched to a second autonomous driving mode having a higher level of autonomous driving than the first autonomous driving mode, the second record level having a more amount of data recorded per unit time than the first record level; and
performing control to store history information in the storage device according to the second record level, the history information including at least one of output information of a sensor mounted on the moving object, derivative information derived from the output information of the sensor, and the travel-planned route, wherein
the derivative information includes a plurality of pieces of derivative information having different record levels according to the respective pieces, and
the plurality of pieces of derivative information include at least two of sensor abnormality information, contradiction information, driver state information, travel-planned route information, travel difficulty information, recommended lane information, peripheral situation analysis result information, and a driving amount of the moving object.

2. The information processing device according to claim 1, wherein
the level of the autonomous driving becomes higher as a level of necessity of operating a control system by a driver of the moving object becomes lower.

3. The information processing device according to claim 1, wherein
the record level is represented by at least one of record object information indicating whether or not information is an object to be recorded, a record detail level, a record interval, and a storage period.

4. The information processing device according to claim 1, wherein performing of the setting sets the record level according to a difficulty in traveling the travel-planned route.

5. The information processing device according to claim 4, wherein the difficulty is determined on the basis of the travel-planned route and the output information of the sensor.

6. An information processing method comprising:
acquiring a driving mode indicating a level of autonomous driving of a moving object, the driving mode including a non-autonomous driving mode and autonomous driving modes;
performing setting by correcting a first record level calculated based on a travel-planned route for the moving object to autonomously travel according to a first autonomous driving mode, to a second record level when the driving mode is switched to a second autonomous driving mode having a higher level of autonomous driving than the first autonomous driving mode, the second record level having a more amount of data recorded per unit time than the first record level; and
performing control to store history information in a storage device according to the second record level, the history information including at least one of output information of a sensor mounted on the moving object, derivative information derived from the output information of the sensor, and the travel-planned route, wherein the derivative information includes a plurality of pieces of derivative information having different record levels according to the respective pieces, and the plurality of pieces of derivative information include at least two of sensor abnormality information, contradiction information, driver state information, travel-planned route information, travel difficulty information, recommended lane information, peripheral situation analysis result information, and a driving amount of the moving object.

7. A computer program product containing instructions embodied in and stored on a non-transitory computer readable medium, wherein the instructions, when executed by a computer, cause the computer to perform:

acquiring a driving mode indicating a level of autonomous driving of a moving object, the driving mode including a non-autonomous driving mode and autonomous driving modes;

performing setting by correcting a first record level calculated based on a travel-planned route for the moving object to autonomously travel according to a first autonomous driving mode, to a second record level when the driving mode is switched to a second autonomous driving mode having a higher level of autonomous driving than the first autonomous driving mode, the second record level having a more amount of data recorded per unit time than the first record level; and performing control to store history information in a storage device according to the second record level, the history information including at least one of output information of a sensor mounted on the moving object, derivative information derived from the output information of the sensor, and the travel-planned route, wherein the derivative information includes a plurality of pieces of derivative information having different record levels according to the respective pieces, and the plurality of pieces of derivative information include at least two of sensor abnormality information, contradiction information, driver state information, travel-planned route information, travel difficulty information, recommended lane information, peripheral situation analysis result information, and a driving amount of the moving object.

\* \* \* \* \*